US008402469B2

(12) United States Patent
Bose et al.

(10) Patent No.: US 8,402,469 B2
(45) Date of Patent: Mar. 19, 2013

(54) ALLOCATING RESOURCES FOR PARALLEL EXECUTION OF QUERY PLANS

(75) Inventors: Sumit Kumar Bose, Bangalore (IN); Srikumar Krishnamoorthy, Bangalore (IN); Nilesh Dilip Ranade, Pune (IN)

(73) Assignee: Infosys Limited, Bangalore (IN)

( * ) Notice: Subject to any disclaimer, the term of this patent is extended or adjusted under 35 U.S.C. 154(b) by 1193 days.

(21) Appl. No.: 12/192,061

(22) Filed: Aug. 14, 2008

(65) Prior Publication Data
US 2009/0254916 A1 Oct. 8, 2009

(30) Foreign Application Priority Data

Apr. 8, 2008 (IN) .............................. 881/CHE/2008

(51) Int. Cl.
*G06F 9/46* (2006.01)
(52) U.S. Cl. ...................................................... 718/104
(58) Field of Classification Search .................... 718/104
See application file for complete search history.

(56) References Cited

PUBLICATIONS

"Accelerating merger and acquisition success: Integrating organizations through content," IBM WebSphere Information Integrator Content Edition, Sep. 2005, 20 pages.
Bose et al., "Allocating Resources to Parallel Query Plans in Data Grids," Grid and Cooperative Computing (GCC) 2007, Sixth International Conference, Aug. 16-18, 2007, 14 pages.
Bernstein et al., "Query Processing in a System for Distributed Databases (SDD-1)," *ACM Transactions on Database Systems*, vol. 6, No. 4, Dec. 1981, pp. 602-625, 24 pages.
Boudet et al., "One-Step Algorithm for Mixed Data and Task Parallel Scheduling Without Data Replication," *In 17th International Parallel and Distributed Processing Symposium*, (IPDPS-2003). Los Alamitos, CA, IEEE Computer Society, 2003, 20 pages.
Cherniack, "Designing Systems for the Grid: The Problem with "Retrofitting" Part 1," The Database Column, Jun. 19, 2008, 5 pages.
Dail et al., "Scheduling in the Grid Application Development Software Project," in J. Nabrzyski, J. Schopf, and J. Weglarz (eds), *Grid Resource Management: State of the Art and Future Trends*, Kluwer Academic Publishers Group, 2003, 32 pages.
DeWitt et al., "GAMMA—A High Performance Dataflow Database Machine," *In Proc. of the 12th VLDB Conf.*, 1986, pp. 228-237, 8 pages.
DeWitt et al., "Parallel Sorting on a Shared Nothing Architecture Using Probabilistic Splitting," *In Proceedings of the 1st International Conference on Parallel and Distributed Information Systems*, Miami, FL., 1991, pp. 280-291, 24 pages.
Epstein et al., "Distributed Query Processing in a Relational Data Base System," *In Proc. of the ACM SIGMOD Conf.*, 1978, pp. 169-180, 12 pages.
Gounaris et al., "A Novel Approach to Resource Scheduling for Parallel Query Processing on Computational Grids," *Distributed Parallel Databases*, vol. 19, 2006, pp. 87-106, 20 pages.
Gounaris, "Grid Performance Issues in the Design of a Grid-Enabled Query Processor," APART workshop, Larnaca, Mar. 27-28, 2003, 46 pages.

(Continued)

*Primary Examiner* — Mengyao Zhe
(74) *Attorney, Agent, or Firm* — Klarquist Sparkman, LLP

(57) ABSTRACT

Computing resources can be assigned to sub-plans within a query plan to effect parallel execution of the query plan. For example, computing resources in a grid can be represented by nodes, and a shortest path technique can be applied to allocate machines to the sub-plans. Computing resources can be provisionally allocated as the query plan is divided into query plan segments containing one or more sub-plans. Based on provisional allocations to the segments, the computing resources can then be allocated to the sub-plans within respective segments. Multiprocessor computing resources can be supported. The techniques can account for data locality. Both pipelined and partitioned parallelism can be addressed. Described techniques can be particularly suited for efficient execution of bushy query plans in a grid environment. Parallel processing will reduce the overall response time of the query.

19 Claims, 25 Drawing Sheets

PUBLICATIONS

Gounaris, "Resource Aware Query Processing on the Grid," Ph.D. Thesis, University of Manchester, 2005, pp. 1-220, 220 pages.

Graefe, "Encapsulation of Parallelism in the Volcano Query Processing System," *In Proceedings of the ACM SIGMOD Conf. on Management of Data*, Atlantic City, NJ, USA, Jun. 1990, pp. 102-111, 10 pages.

Graefe, "Query Evaluation Techniques for Large Databases," *ACM Computing Surveys*, vol. 25, No. 2, Jun. 1993, pp. 73-170, 98 pages.

Information Integration, IBM Website, visited Aug. 6, 2008, 2 pages. http://www-306.ibm.com/software/data/integration/.

Jackson et al., "Performance Analysis of the OGSA-DAI Software," Proceedings of the UK e-Science All Hands Meeting 2004, Sep. 2004, 8 pages.

Kossman. D., "The State of the Art in Distributed Query Processing," *ACM Computing Surveys* (CSUR), vol. 32, Issue 4, Dec. 2000, pp. 422-469, 48 pages.

Liu et al., "GridDB: A Relational Interface for the Grid," SIGMOD 2003, Jun. 2003, San Diego, CA, p. 660, 1 page.

Liu et al., "Revisiting Pipelined Parallelism in Multi-Join Query Processing," *Proc. of the 31st VLDB Conference*, Trondheim, Norway, 2005, pp. 829-840, 12 pages.

Mackert et al., "R* Optimizer Validation and Performance Evaluation for Distributed Queries," *In Proc. of the 12th VLDB Conf.*, Aug. 1986, pp. 149-159, 11 pages.

Query Plan, Wikipedia, the free encyclopedia, visited Aug. 7, 2008, 3 pages.

Radulescu et al., "CPR: Mixed Task and Data Parallel Scheduling for Distributed Systems," *In Proc. of the 15th International Parallel & Distributed Processing Symposium (IPDPS-01)*, IEEE Computer Society, 2001, 8 pages.

Radulescu et al., "A Low-Cost Approach Towards Mixed Task and Data Parallel Scheduling," *In Proc. of 2001 International Conference on Parallel Processing (30th ICPP '01)*, Valencia, Spain, 2001, 20 pages.

Rahm et al., "Dynamic Multi-Resource Load Balancing in Parallel Database Systems," *In Proc. of the 21st VLDB Conf.*, 1995, pp. 395-406, 12 pages.

Ramaswamy et al., "A Framework for Exploiting Data and Functional Parallelism on Distributed Memory Multicomputers," Technical Report CRHC-94-10, University of Illinois, 1994, pp. 1-35, 35 pages.

Ramaswamy et al., "A Framework for Exploiting Task and Data Parallelism on Distributed Memory Multicomputers," *IEEE Transactions on Parallel and Distributed Systems*, vol. 8, No. 11, Nov. 1997, pp. 1098-1115, 19 pages.

Sakellariou, et al., "A Hybrid Heuristic for DAG Scheduling on Heterogeneous Systems," *In Proc. of 13th HCW Workshop*, IEEE Computer Society, 2004, 13 pages.

Sampaio et al., "Validated Cost Models for Parallel OQL Query Processing," *In Proc. of OOIS*, 2002, pp. 60-75, 17 pages.

Serafini et al., "Agent-Based Query Optimisation in a Grid Environment," IASTED International Conference on Applied Informatics, Innsbruck, Austria, Feb. 2001, 6 pages.

SPEC, Standard Performance Evaluation Corporation, www.spec.org, visited Aug. 12, 2008, 1 page.

Wilschut et al., "Parallelism in a Main-Memory DBMS: The Performance of PRISMA/DB," *In Proc. of the 18th VLDB Conf.*, 1992, pp. 1-16, 16 pages.

Wolf et al., "A Hierarchical Approach to Parallel Multi-Query Scheduling," *IEEE Transactions on Parallel and Distributed Systems*, vol. 6, No. 6, Jun. 1995, pp. 578-590, 13 pages.

Yang et al., "Distributed Multi-Join Query Processing in Data Grids," *Information Sciences*, vol. 177, Issue 17, Sep. 1, 2007, pp. 3574-3591, 18 pages.

YarKhan et al., "Experiments with Scheduling Using Simulated Annealing in a Grid Environment," *In Proc. of 3rd International Workshop on Grid Computing GRID*, Jun. 7, 2002, pp. 232-242, 9 pages.

ALLOCATING RESOURCES FOR PARALLEL EXECUTION OF QUERY PLANS

BACKGROUND

Relational databases are at the heart of computer science. A wide variety of applications from e-commerce to bioinformatics rely on database technology. Although there have been a variety of advances in database technology, there remains room for improvement.

SUMMARY

A variety of techniques can be used to effect efficient parallel execution of query plans. As described herein, a query plan can be repeatedly split into query plan segments and computing resources provisionally allocated to the query plan segments. The computing resources can then be distributed among the query sub-plans in a query plan segment according to the provisional allocation.

Computing resources and query plan segments can be represented in a graph. A shortest path in the graph can be found. Responsive to finding the shortest path, computing resources in the shortest path can be allocated to the query plan segments. Allocation can be repeated until there are no more computing resources to be allocated or allocation is no longer profitable.

The resource allocation technologies herein support parallel execution and can address both pipelined and partitioned parallelism.

Allocation for multiprocessor computing resources can be supported, and the techniques can account for data locality.

Parallel processing will reduce the overall response time of the query.

As described herein, a variety of other features and advantages can be incorporated into the technologies as desired.

The foregoing and other features and advantages will become more apparent from the following detailed description of disclosed embodiments, which proceeds with reference to the accompanying drawings.

DETAILED DESCRIPTION

Example 1

Exemplary System Employing a Combination of the Technologies

Figure 1:
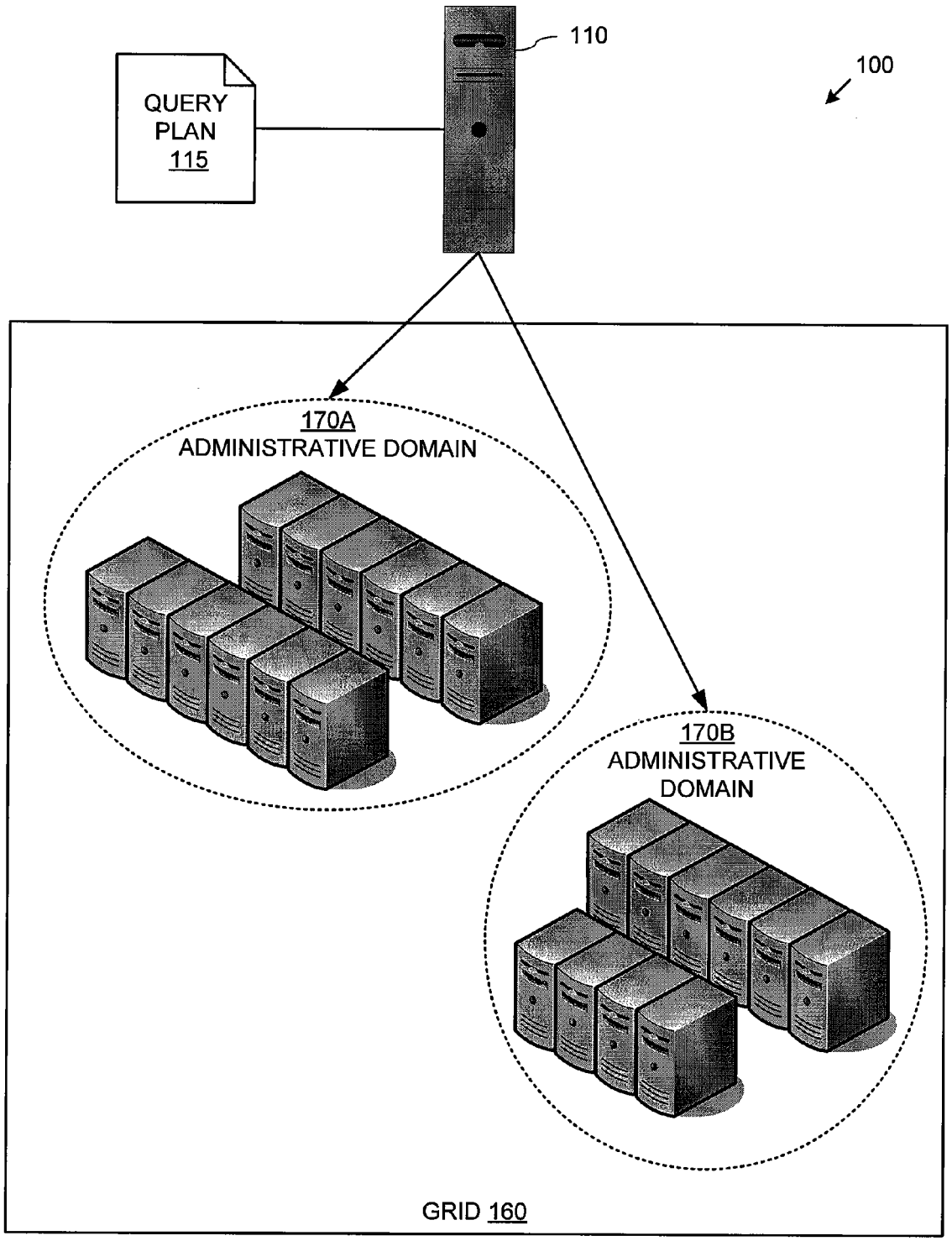
FIG. 1 is a block diagram of an exemplary system implementing the technologies described herein.

FIG. 1 is a block diagram of an exemplary system 100 implementing the technologies described herein. In the example, a client computer 110 wishes to execute the query plan 115 via the grid 160. The grid 160 can comprise a plurality of computing resources organized into a plurality of administrative domains 170A, 170B.

As described herein, computing resources in the grid can be allocated for parallel execution of the query plan 115. The resource allocation techniques described herein can support both pipelined parallelism and partitioned parallelism.

In practice, the system 100 can be more complicated, with additional functionality, more administrative domains, additional computing resources, and the like.

Example 2

Exemplary Method of Applying a Combination of the Technologies

Figure 2:
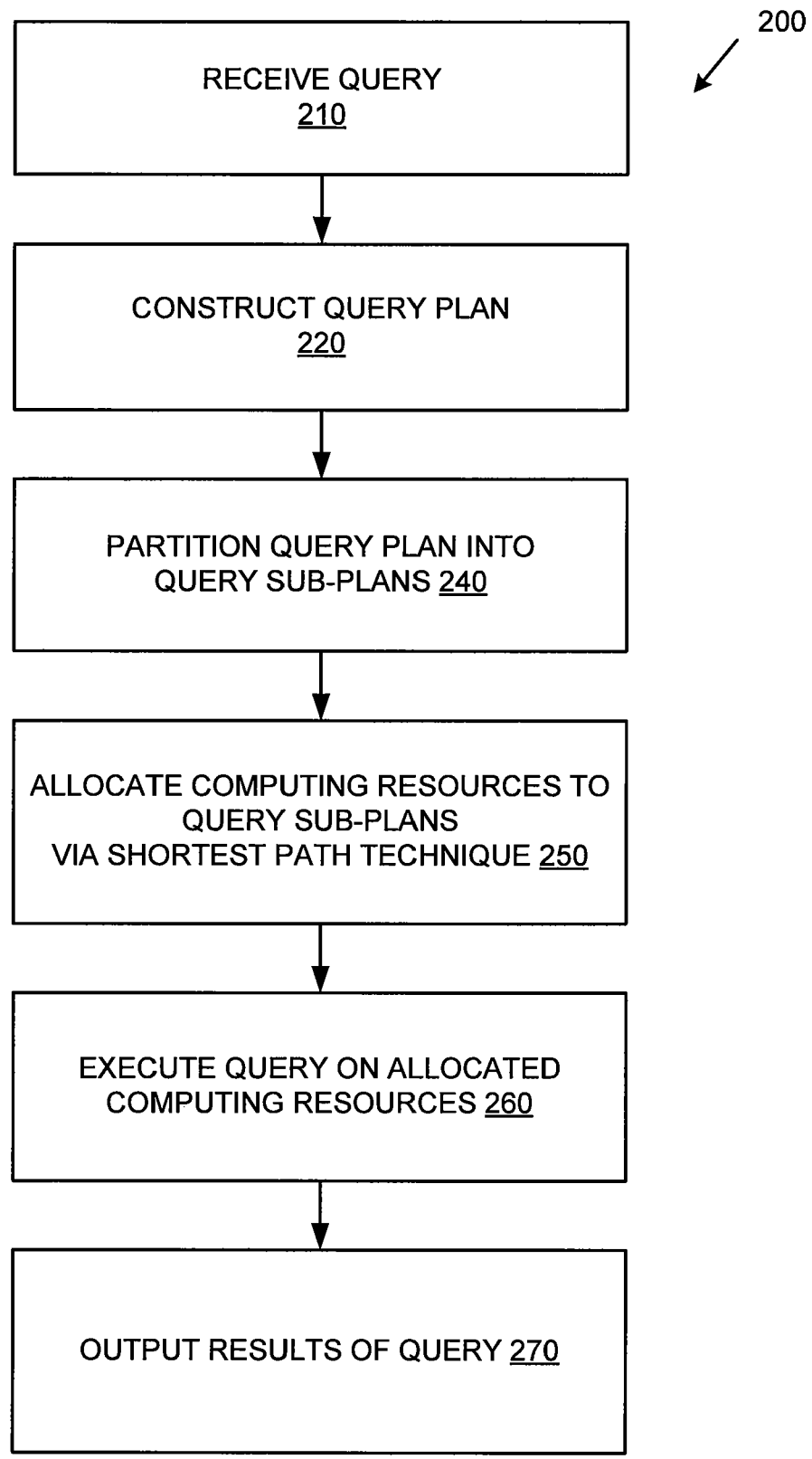
FIG. 2 is a flowchart of an exemplary method of applying the resource allocation technologies described herein to query processing.

FIG. 2 is a flowchart of an exemplary method 200 of applying the resource allocation technologies described herein to query processing and can be implemented, for example, in a system such as that shown in FIG. 1. The technologies described herein are generic to the specifics of query processing and can be applied in any variety of database environments to take advantage of parallel query plan processing.

At 210, a query is received. The query can be of any format for specifying a query in a relational query language (e.g., SQL, or the like), object query language (e.g., OQL or the like), or the like.

At 220, a query plan is constructed for the query. The technologies described herein can be of particular benefit to bushy query plans, so bushy query plans need not be excluded when constructing the query plan.

At 240, the query plan is partitioned into query sub-plans.

At 250, computing resources are allocated to the query sub-plans via a shortest path technique as described herein.

At 260, the query is executed on the allocated computing resources.

At 270, the results of the query are output.

The method 200 and any of the methods described herein can be performed by computer-executable instructions stored in one or more computer-readable media (e.g., storage or other tangible media).

Example 3

Exemplary System Processing a Query Plan

Figure 3:
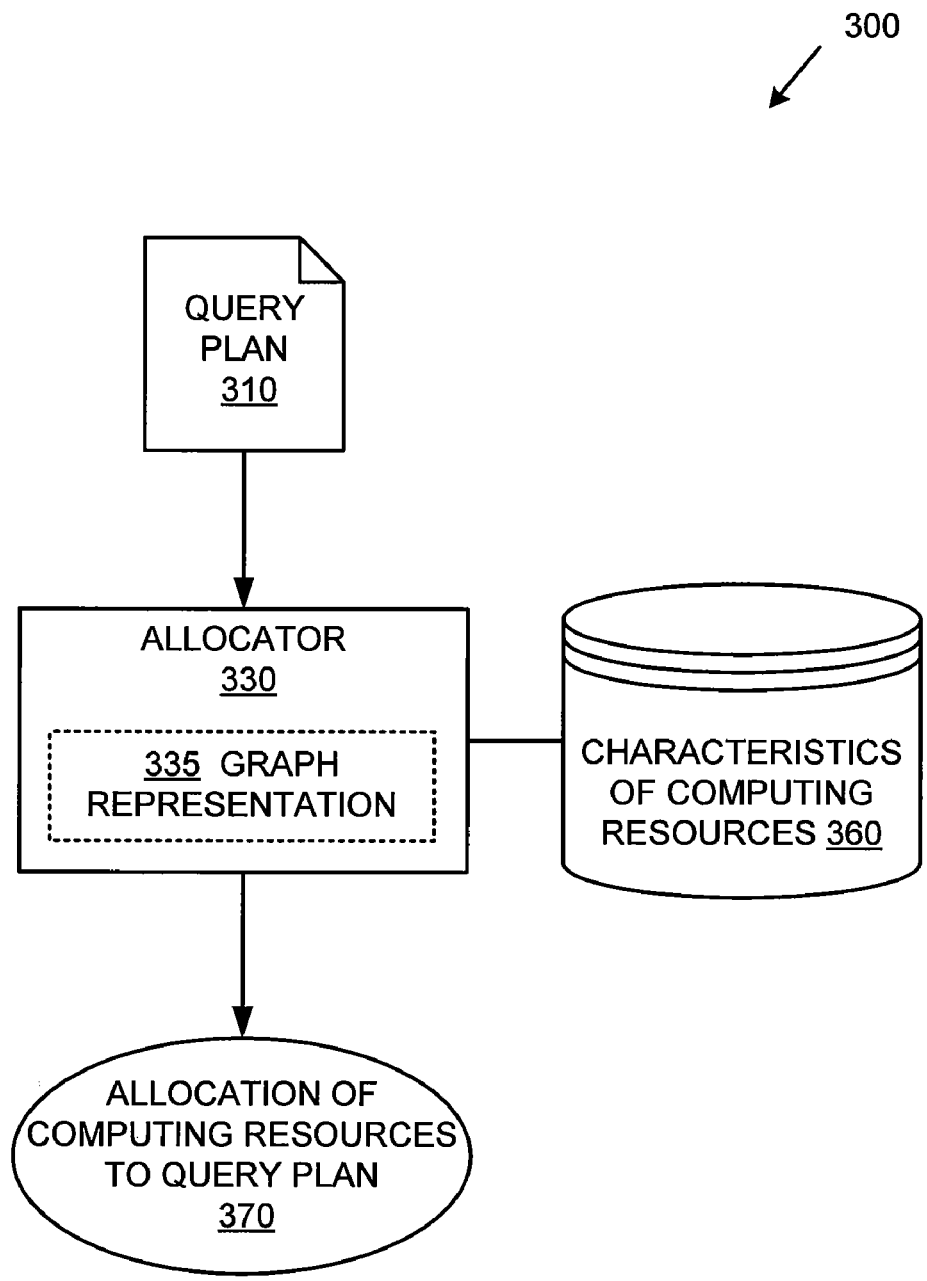
FIG. 3 is a block diagram of an exemplary system processing a query plan via the resource allocation technologies described herein.

FIG. 3 is a block diagram of an exemplary system 300 processing a query plan 310 via the resource allocation technologies described herein.

The query plan 310 can be any of the query plans described herein and can be stored in computer-readable media (e.g., storage or other tangible media). In practice, accompanying information indicating the characteristics of the data resources estimated as required for processing the sub-plans of the query plan (e.g., the amount of data, such as number of bytes to be processed in a sub-plan) can also be included.

Information about selectivity (e.g., what percentage of data is expected to result) can be obtained from metadata tables or a catalog of the database.

The computing resource allocator 330 accepts the query plan 310 as input and outputs an allocation 370 of computing resources to the query plan (e.g., to individual sub-plans of the query plan).

The allocator 330 can consult the characteristics 360 of the computing resources to determine how to construct the graph representation 335 when making decisions concerning which computing resources to allocate to which of the query sub-plans.

The characteristics 360 can include the processing capacity, communication cost between computing resources, number of processors, and the like for the computing resources. Processing capacity of machines of different makes and types can be normalized using benchmarks (e.g., available from the Standard Performance Evaluation Corporation, SPEC, or some other source).

As described herein, the graph representation 335 can represent the computing resource allocation problem by representing the query plan segments and computing resources as nodes. The graph representation 335 can represent a cost of processing a query segment at respective of the computing resources and a cost of communication between the computing resources.

The allocator 330 can find a shortest path in the graph representation 335 from one query plan segment to another query plan segment. The shortest path represents a solution to the allocation problem, and those computing resources associated with (e.g., in) the shortest path can be allocated to the associated (e.g., neighboring) respective query plan segments.

Example 4

Exemplary Method of Processing a Query Plan

Figure 4:
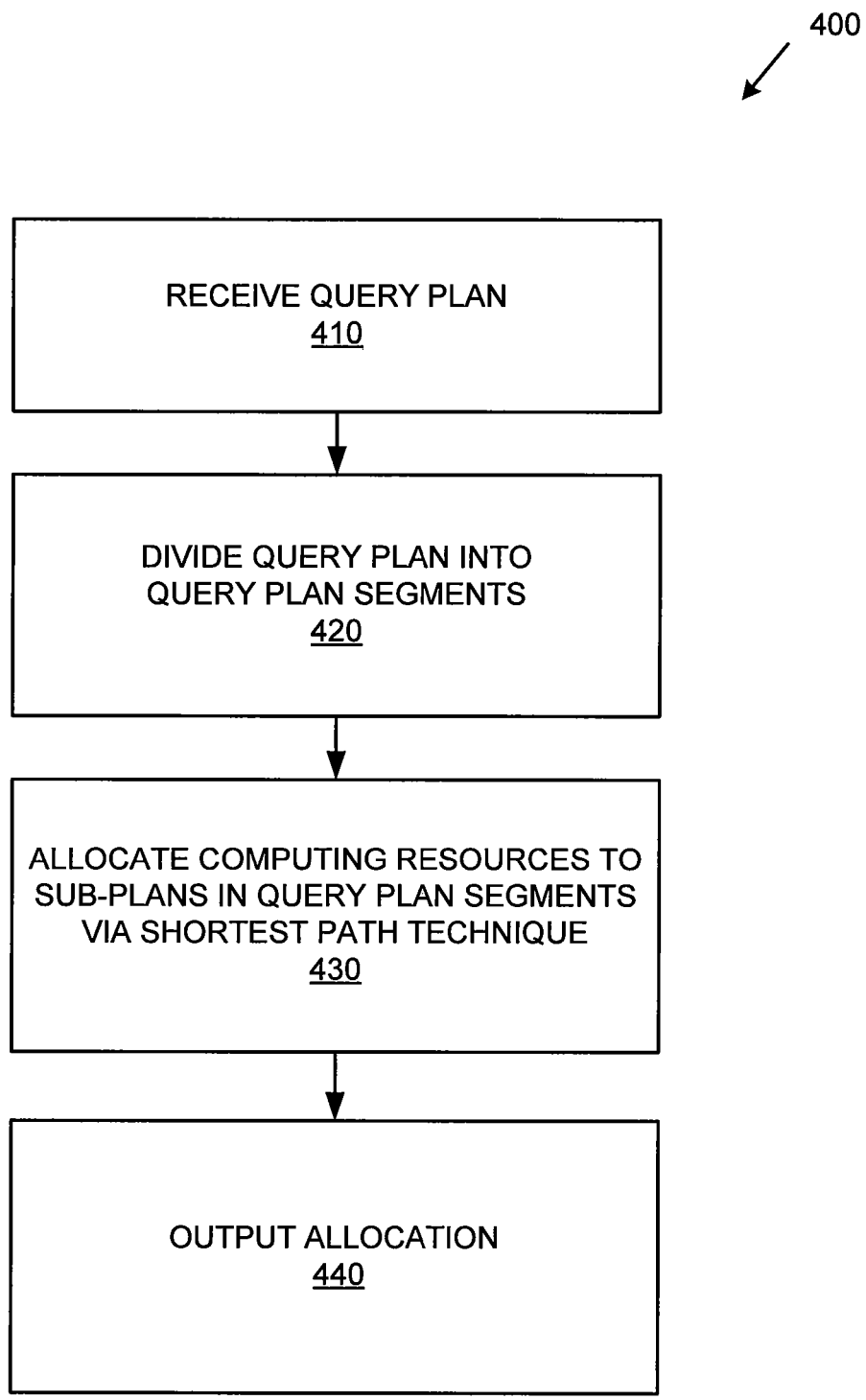
FIG. 4 is a flowchart of an exemplary method of processing a query plan.

FIG. 4 is a flowchart of an exemplary method 400 of processing a query plan and can be implemented, for example, in a system such as that shown in FIG. 3.

At 410, a query plan is received.

At 420, the query plan is divided into query plan segments.

At 430, computing resources are allocated to sub-plans in the query plan segments via a shortest path technique. For example, a provisional allocation technique to segments followed by distribution to sub-plans in the respective segments as described herein can be applied.

At 440, the allocation is output. The output can be of any form suitable for determining which computing resources are allocated to which query sub-plans of the query plan.

Example 5

Exemplary Query Plan Division

Figure 5:
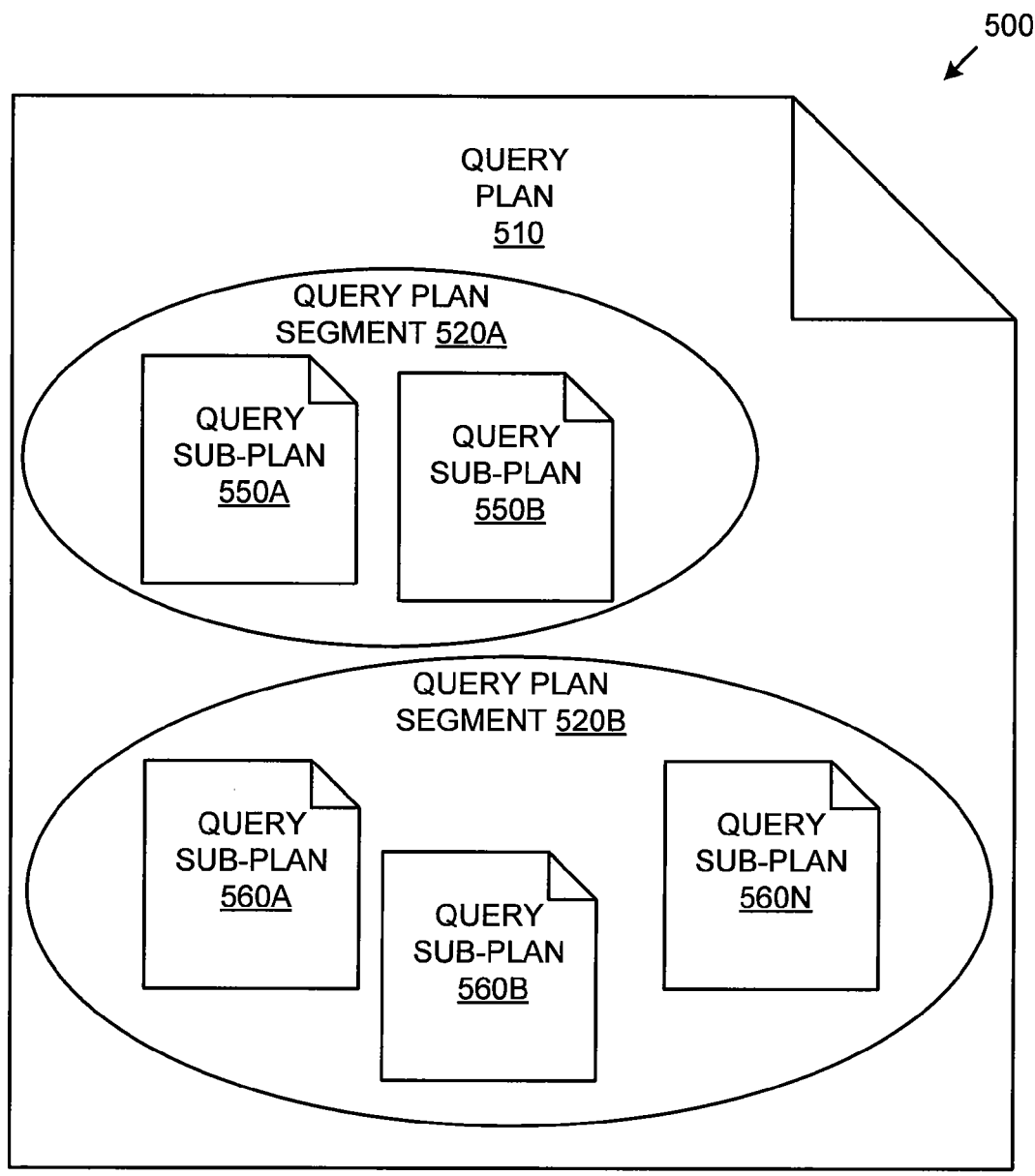
FIG. 5 is a block diagram of an exemplary query plan with query plan segments and query sub-plans.

FIG. 5 is a block diagram of an exemplary query plan with query plan segments and query sub-plans. The details of query plan segments are described elsewhere herein.

In the example, a query plan 510 has a plurality of query plan segments 520A, 520B. The query plan segments 520A, 520B have respective query sub-plans 550A, 550B, 560A, 560B, 560N associated therewith.

Example 6

Exemplary Method of Allocating Computing Resources to a Query Plan

Figure 6:
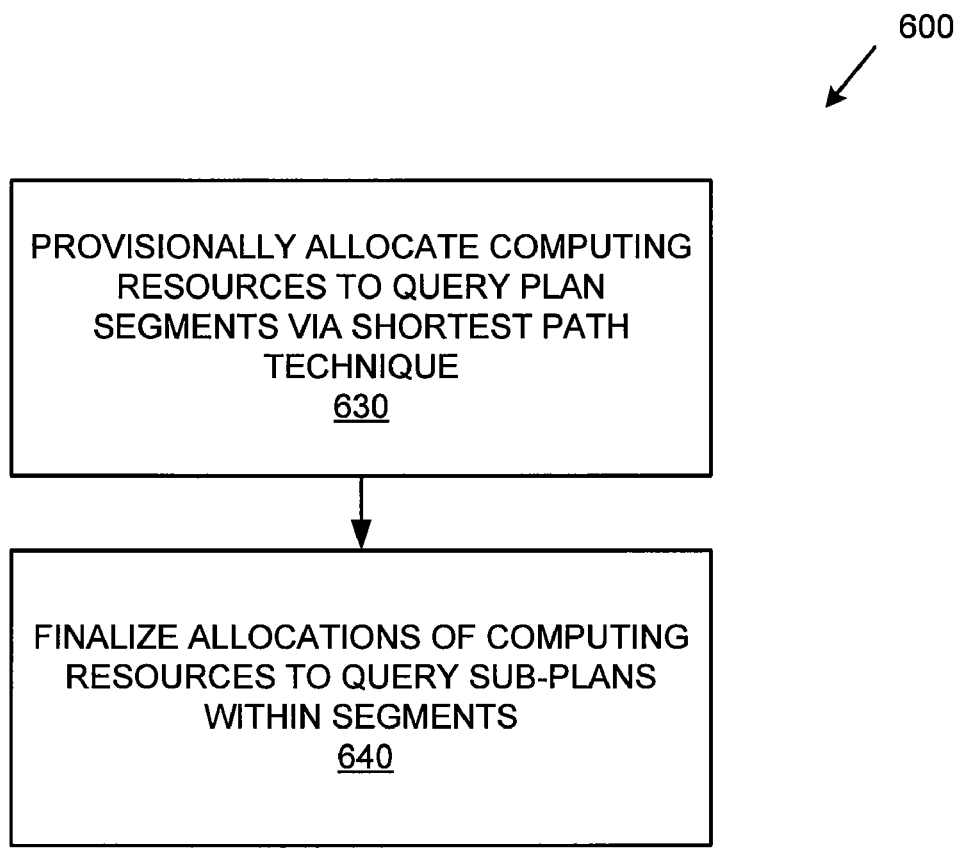
FIG. 6 is a flowchart of an exemplary method of allocating computing resources to a query plan for parallel execution.

FIG. 6 is a flowchart of an exemplary method of allocating computing resources to a query plan for parallel execution and can be implemented, for example, in a system such as that shown in FIG. 5.

At 630, computing resources are provisionally allocated to query plan segments via a shortest path technique. For example, a graph can be constructed to represent the query plan segments and the computing resources. The computing resources on the shortest path can be assigned and removed from the graph and the process repeated until no further resources remain or no performance gain is predicted.

At 640, the allocations of the computing resources to the query sub-plans within respective segments can be finalized. For example, the computing resources provisionally allocated to a query plan segment can be distributed among the query sub-plans in the segment.

Example 7

Exemplary Query Plan

In any of the examples herein, a query plan can be any representation of how to perform processing of a query to find the results sought by the query. In practice, the query plan is an executable representation of the query.

Figure 7:
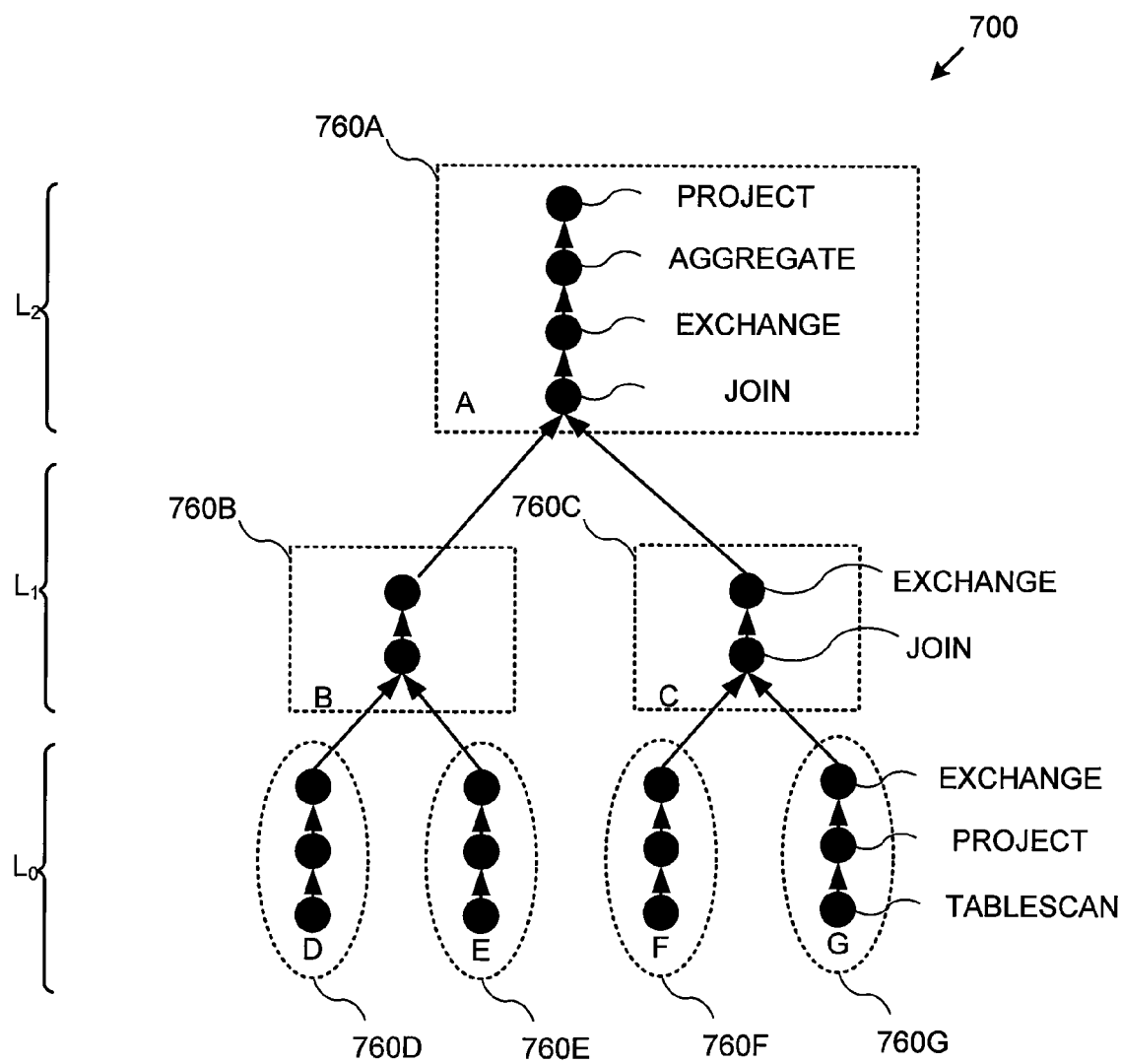
FIG. 7 is a block diagram of an exemplary query plan with query sub-plans.

FIG. 7 is a block diagram of an exemplary query plan 700 dividable into query sub-plans 760A-G. In the example, the data flows from bottom to top and the query plan 700 comprises a plurality of operators (e.g., project, aggregate, exchange, join, tablescan, and the like). The result of one operator can be fed to a subsequent operator. In some cases, an operator takes two inputs (e.g., is a binary operator). An example of a binary operator is a join operator.

Example 8

Exemplary Query Sub-Plan

In any of the examples herein, a query plan can be divided into a plurality of query sub-plans. In practice, the join operator or the exchange operator can be used to denote the boundary between query sub-plans. So, in the example of FIG. 7, the query plan 700 can be divided into the sub-plans A-G 760A-G.

Resources can be individually and separately allocated to respective query sub-plans.

Example 9

Exemplary Query Sub-Plan Level

In any of the examples herein, a query sub-plan level (or "query plan level" or simply "level") can be those query sub-plans at the same level in the query plan (e.g., when the query plan is arranged in a hierarchical fashion according to input/output relationships between the query sub-plans).

By convention, because data flows from the bottom of the query plan when pictured as shown in FIG. 7, the bottom level is considered level "0." Subsequent levels proceeding up the query plan would be level 1, level 2, and so forth. Thus, the query 700 has 3 levels (0, 1, and 2).

Example 10

Exemplary Query Plan Segment

In any of the examples herein, a query plan segment is a set of query sub-plans at one or more contiguous levels (e.g., levels 1 and 2) in the query plan. A query plan segment can have one or more levels of query sub-plans associated with it. In practice, segments with more than one level are eventually split into smaller segments until the segment has only one level (with one or more query sub-plans at the resulting level).

Example 11

Exemplary Estimation of Amount of Data to be Processed

The amount of data (e.g., in bytes) estimated to be processed by a sub-plan k can be represented as $A_k$. $A_k$ can be estimated as the summation of the data processing estimates for the operators that make up the sub-plan k.

If available for the tables involved in the query, metadata can be helpful in estimating the amount of data to be processed for the operators making up the sub-plan. For example, if metadata indicates that an Employees table has 1000 records with 1 MB of information, and there is a query "Select * From Employees," the data processing estimation of a tablescan operator would be 1 MB.

Metadata concerning predicted number of hits can also be stored (e.g., as histograms). So, for example, if query is "Select emp.ID From Employees Where emp.age=35," it may be known that there are approximately 40 such tuples in the database. If so, then the approximate size can be calculated as the size of each tuple (1/1000) times the number of records (40), yielding (1/1000)*40 MB=0.04 MB.

Similarly, selectivity can be estimated based on detailed information stored in metadata, if available. For operators such as join and the like, the data processing estimate can be calculated by multiplying the data processing estimate of the immediate downstream operator with the selectivity of the immediate downstream operator.

However, the techniques described herein do not depend on a particular estimate of data processing and can take advantage of other information, more accurate information, or less accurate information, if available.

Example 12

Exemplary Communication Cost

In any of the examples herein, the cost of communicating from one computing to another can be represented in a graph depicting the allocation problem. As described herein, the communication cost can be represented as $N_{jj'}$.

$N_{jj'}$ can be calculated as $1/Net_{jj'}$ (the average capacity of the arc connecting the computing resource j to the computing resource j'). $Net_{jj'}$ can be calculated as described herein. It may not be possible to directly separately measure certain quantities, such as congestion and distance. However it is possible to measure congestion and distance together by sending a probe packet from computing resource j to computing resource j' and measuring the time taken by the probe packet for a round trip.

For illustration purposes, after measuring the time RT to send a probe packet of size x round trip between two machines, one can estimate the time to send B bytes from one machine to another as $T_{Estimated} = (RT*(B/x))/2$ (e.g., under an assumption that communication cost is symmetrical).

However, the techniques described herein do not depend on a particular measurement of communication cost and can take advantage of other information, more accurate information, or less accurate information, if available.

Example 13

Exemplary Estimation of Communication Cost

The estimation of communication cost between nodes can be maintained by a metadata manager. For example, probe packets can be sent from one node to another and the time calculated for the probe packed to make a round trip. Estimation can thereby account for traffic and congestion present in the network between the two nodes at a particular point in time. Such data can be collected periodically and stored with the characteristics of the computing resources (e.g., characteristics 360 of FIG. 3).

Example 14

Exemplary Grid

In any of the examples herein, a data grid (or "grid") can take a variety of forms. For example, a grid can comprise a plurality of grid nodes and one or more governance mechanisms (e.g., grid agents) that govern access to the grid nodes. In practice, the governance mechanism can serve as a central control over grid resource allocation and can be implemented in middleware for the grid. Any node supporting the standard framework implemented by the grid middleware can participate in the grid as a grid node.

In practice, a grid node can be a computing resource, such as a physical computing device (e.g., a computer, server, workstation, or the like). A grid can support a node that is a collection of computing resources (e.g., a plurality of computers, a cluster of computers, or the like). In practice, a node can also take the form of resources such as network resources, storage resources, and the like. A node can be an independent piece of hardware that makes itself available to the grid for processing grid tasks via a standard framework as dictated by a central governance mechanism (e.g., a grid agent).

To clients of the grid, the grid appears as an abstraction of grid resources (e.g., CPU cycles, disk storage, memory, and the like) that are available for use. The client of the grid can submit a request for resources, such as processing a task or job. In response the grid allocates appropriate resources, processes the task, and provides results of processing.

Although grids can support heterogeneous hardware, a grid can be implemented in a homogenous manner. Similarly, a grid can support different administrative domains (e.g., to allow sharing of resources), but a grid can be administered as a single domain.

Grid nodes can advertise the resources available at the node. The resources can be used as described herein to predict processing capacity at the grids.

Example 15

Exemplary Grid Agent

In any of the examples herein, a grid agent can govern access to grid resources. For example, clients of the grid can request resources from the grid agent, which then grants the request by allocating grid resources to the request.

The grid agent can communicate with grid nodes using a standard framework. For example, a resource request can be indicated in terms of a particular desired machine, processing needs (e.g., CPU cycles), storage (e.g., gigabytes), memory (e.g., megabytes), or the like. Other resources can be included in the request.

Example 16

Exemplary Computing Resources

In any of the examples herein, a computing resource can be any resource configured for processing elements of a query plan. In practice, such computing resources are typically presented as server computers, sometimes called "machines." As described herein, the computing resources may have one processor or multiple processors. A computer with multiple processors can be treated as a plurality of computing resources (e.g., one per processor) during the allocation techniques described herein.

All computing resources or a subset of them can be designated as allocable to the query plan.

As described herein, the computing resources can be available via a data grid mechanism.

In practice, a computing resource can be identified by a name, identifier, or both.

Example 17

Exemplary Allocation

In any of the examples described herein, allocation of a query sub-plan to a computing resource can be accomplished by storing an association of the query sub-plan and a particular computing resource (e.g., via a query sub-plan name/identifier and a computing resource name/identifier). The allocation can be stored in computer-readable media (e.g., storage or other tangible media).

Provisional allocation to a query plan segment can be accomplished by storing an association of a computing resource and a query plan segment. In some cases, the computing resource can be again provisionally allocated to a child segment of the query plan segment to which it was allocated. Final allocation can take the form of allocating the computing resource to a query sub-plan within the segment to which it was provisionally allocated.

The allocation of a query plan can take the form of the set of allocations for the query sub-plans therein (e.g., stored associations between computing resources and respective query sub-plans of the query plan).

Other mechanisms not shown (e.g., a scheduler) can apply the allocation to effect execution of the query plan on the computing resources indicated in the allocation. Computing resources for an allocation can reside in a same or different administrative domains.

Example 18

Figure 8:
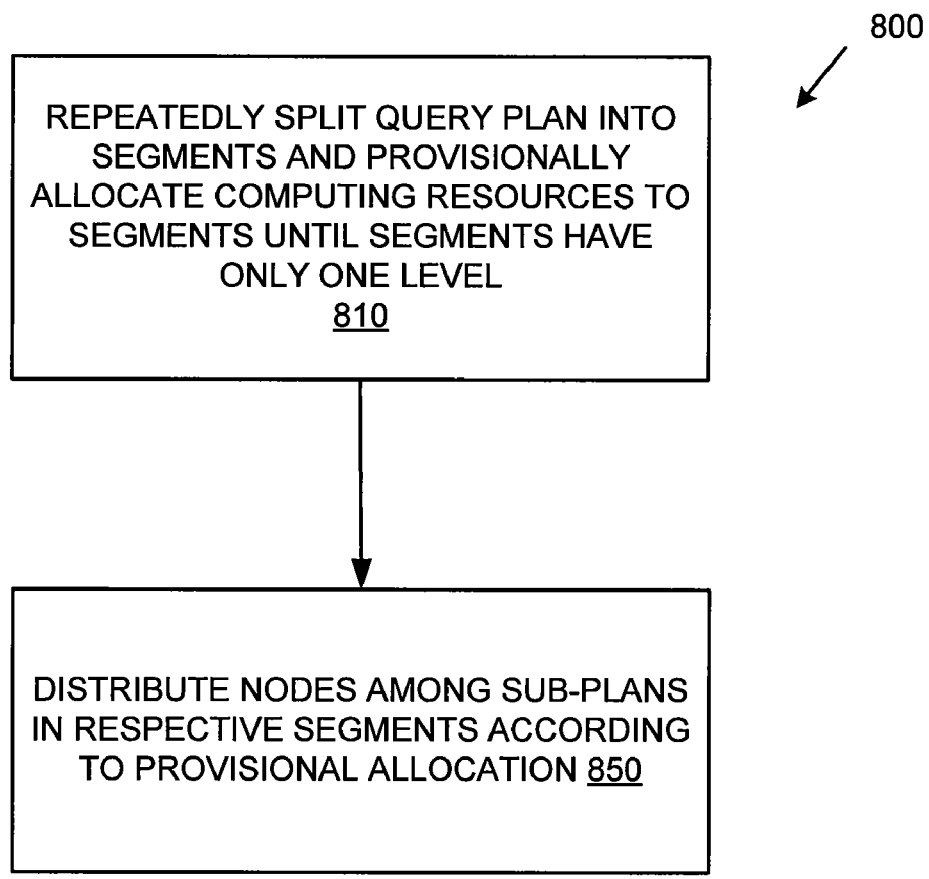
FIG. 8 is a flowchart of an exemplary method of allocating computing resources via provisional allocation to query plan segments.

Exemplary Method of Allocating Computing Resources Via Provisional Allocation FIG. 8 is a flowchart of an exemplary method of allocating computing resources via provisional allocation to query plan segments and can be implemented, for example, for a query plan such as that shown in FIG. 7.

At 810, the query plan is repeatedly split into segments and computing resources are provisionally allocated to the segments until the segments have only one level.

At 850, the computing resources are distributed among the query sub-plans in respective segments according to the provisional allocation.

Example 19

Exemplary Graph Representation of Allocation Problem and Shortest Path Search Technique In any of the examples herein, any of the allocations described herein can be accomplished by representing the allocation problem in a graph. For example, communication costs between the computing resources can be represented along with the estimated processing time for a computing resource to complete processing of a query sub-plan.

The graph can then be consulted to determine which resources to allocate. For example, finding the shortest path between two query segments in the graph can indicate the computing resources to be allocated to respective query segments. As described herein, a computing resource can be represented by a pair of nodes in the graph.

When a resource is allocated, it can then be removed from the graph, and the technique can be repeated (e.g., the remaining shortest path can be found).

Example 20

Figure 9:
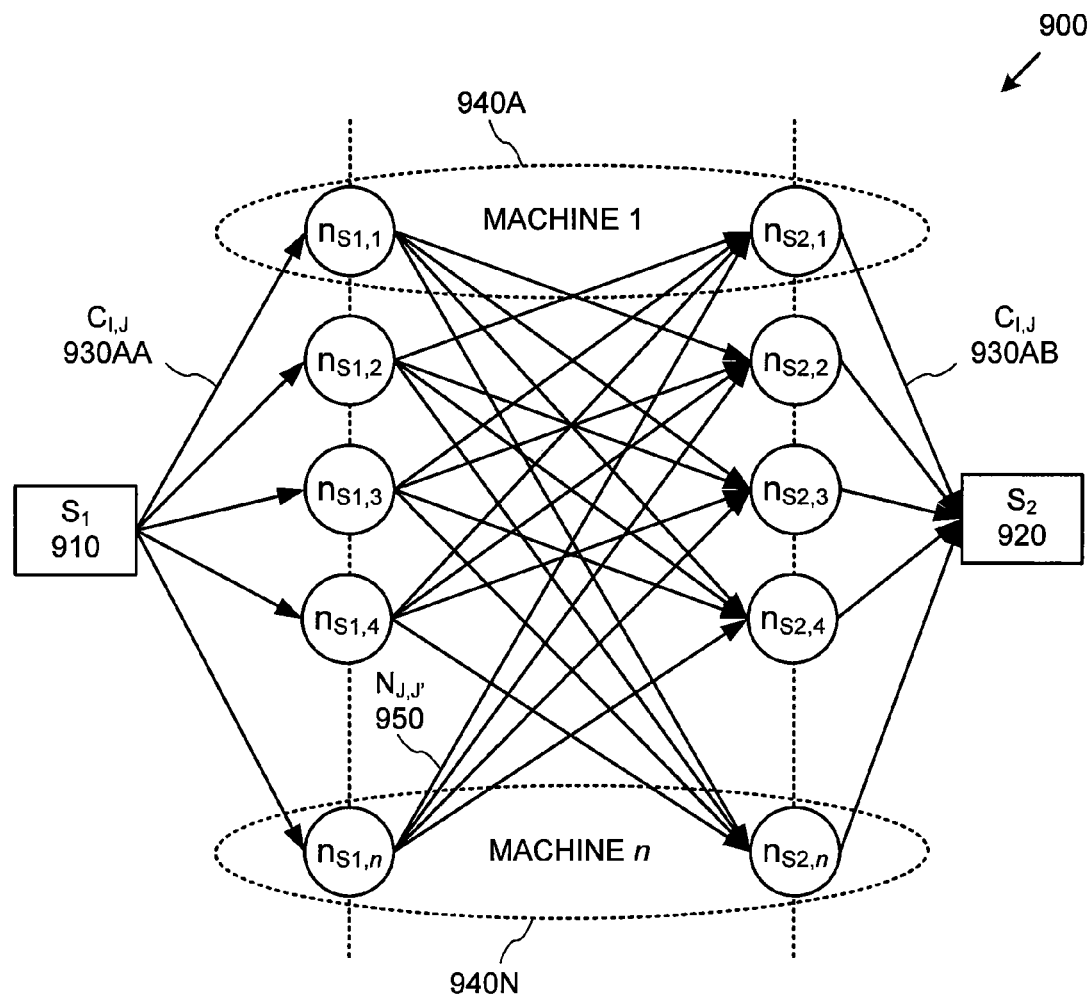
FIG. 9 is an exemplary graph representation of a computing resource allocation problem.

Exemplary Implementation of Graph Representation of Allocation Problem and Shortest Path Search Technique FIG. 9 is an exemplary graph representation 900 of a computing resource allocation problem. In the example, two query plan segments are represented as query plan nodes 910, 920.

Computing resources are represented in the graph 900 as respective pairs of nodes. For example, a computing resource "Machine 1" is represented as a pair of nodes 940A ($n_{S1,1}$ and $n_{S2,1}$) and "Machine n" is represented as a pair of nodes 940N ($n_{S1,n}$ and $n_{S2,n}$).

Arcs (e.g., edges) in the graph can be used to represent the processing cost (e.g., predicted processing time) for a computing resource to process the query plan segment. So, for example, the arc 930AA represents the predicted processing time for the computing resource "Machine 1" to complete processing of the query plan segment $S_1$. The arc 930AB represents the predicted processing time for the computing resource "Machine 1" to complete processing of the query plan segment $S_2$. In practice, the measure $C_{i,j}$ can be used, but other measures representing the processing of the query plan segment as a cost can be used. An estimate of the cost can be based at least on the amount of data to be processed for the sub-plans in the segment.

Arcs can also be used to represent the predicted communication cost (e.g., predicted communication time) to send results of one query segment to another machine for processing. So, for example, the arc 950 represents the predicted communication time to send results of the query segment $S_1$ from Machine n to Machine 1. In practice, the measure $N_{j,j'}$ can be used, but other measures representing communication between nodes as a cost can be used.

When the allocation problem is represented as a graph, the shortest path from the source 910 to the sink 920 can be found. The computing resources on the shortest path can then be assigned (e.g., provisionally) to the respective query plan segments (e.g., the query plan segment neighboring the computing resource in the graph).

Figure 10:
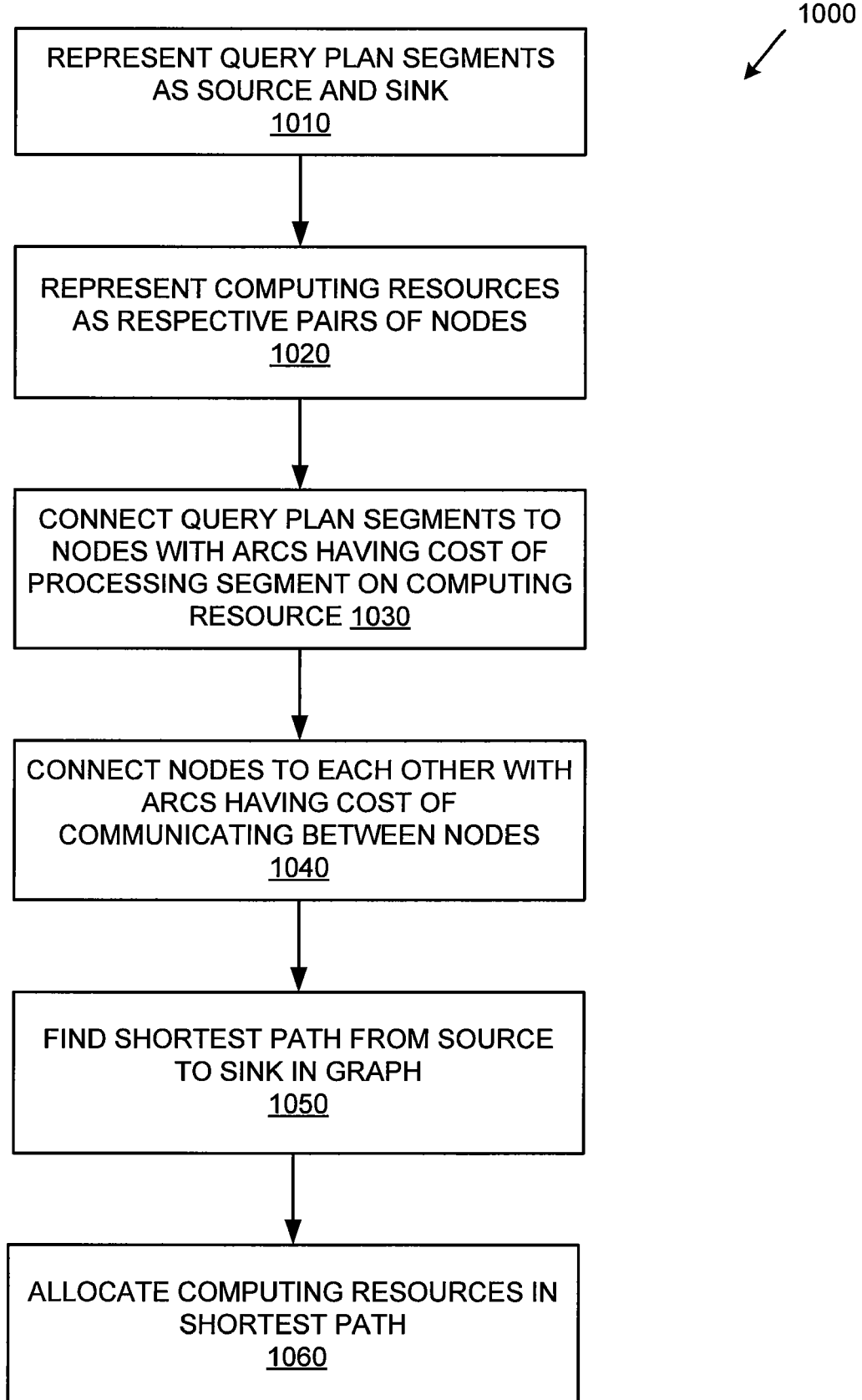
FIG. 10 is a flowchart of an exemplary method of allocating computing resources via finding a shortest path in a graph representation of a computing resource allocation problem.

FIG. 10 is a flowchart of an exemplary method 1000 of allocating computing resources via building a graph representation of a computing resource allocation problem such as that shown in FIG. 9 and finding a shortest path therein. In practice, the method takes two neighboring query plan segments as input and outputs an allocation of a first computing resource for the first query plan segment and an allocation of a second computing resource for the second query plan segment.

At 1010, the query plan segments are represented in the graph as a source (e.g., the lower segment) and a sink (e.g., the upper segment).

At 1020, the computing resources are represented in the graph as respective pairs of nodes.

At 1030, the query plan segments are connected to nodes representing the computing resources with arcs having a cost of processing the segment on the respective computing resource.

At 1040, the nodes representing the computing resources are connected to each other with arcs having a cost of communicating between the respective computing resources.

At 1050, a shortest path from the source to sink in the graph is found.

At 1060, the computing resources in the shortest path are allocated to respective of the query segments represented in the graph.

Example 21

Figure 11:
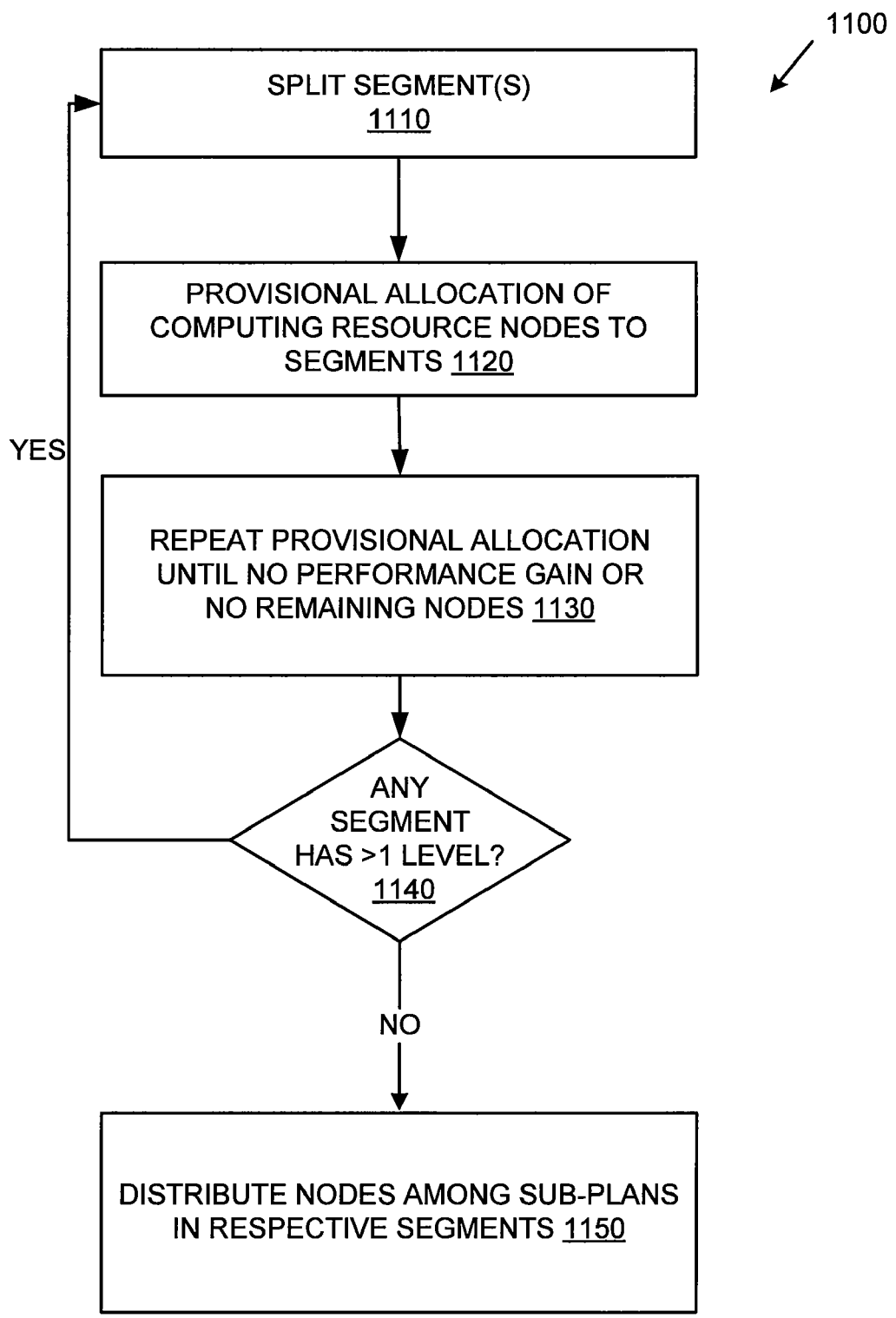
FIG. 11 is a flowchart of an exemplary method of allocating computing resources via provisional allocation and subsequent node distribution among query sub-plans.

Exemplary Method of Allocating Computing Resources Via Provisional Allocation and Subsequent Distribution FIG. 11 is a flowchart of an exemplary method of allocating computing resources via provisional allocation and subsequent node distribution among query sub-plans and can be implemented in any of the examples herein.

At 1110, query plan segments having more than one level are split. Initially, the entire query plan can be considered as a single segment. Sub-plans in the same level are kept in the same segment (e.g., sub-plans in the same level are not split between segments).

At 1120, a provisional allocation of computing resource nodes to the segments is performed (e.g., via the techniques in FIGS. 9 and 10 or any of the other examples herein). For example, two computing resources are allocated at a time.

At 1130, the provisional allocation is repeated until there is no performance gain or no remaining computing resources to be allocated (e.g., the graph is empty).

At 1140, it is decided whether any query segment has more than one level. If so, splitting continues at 1110.

At 1150, when the segments have one level, the nodes are distributed among the sub-plans in respective segments.

Example 22

Exemplary Execution of Allocation Technologies

Figure 12:
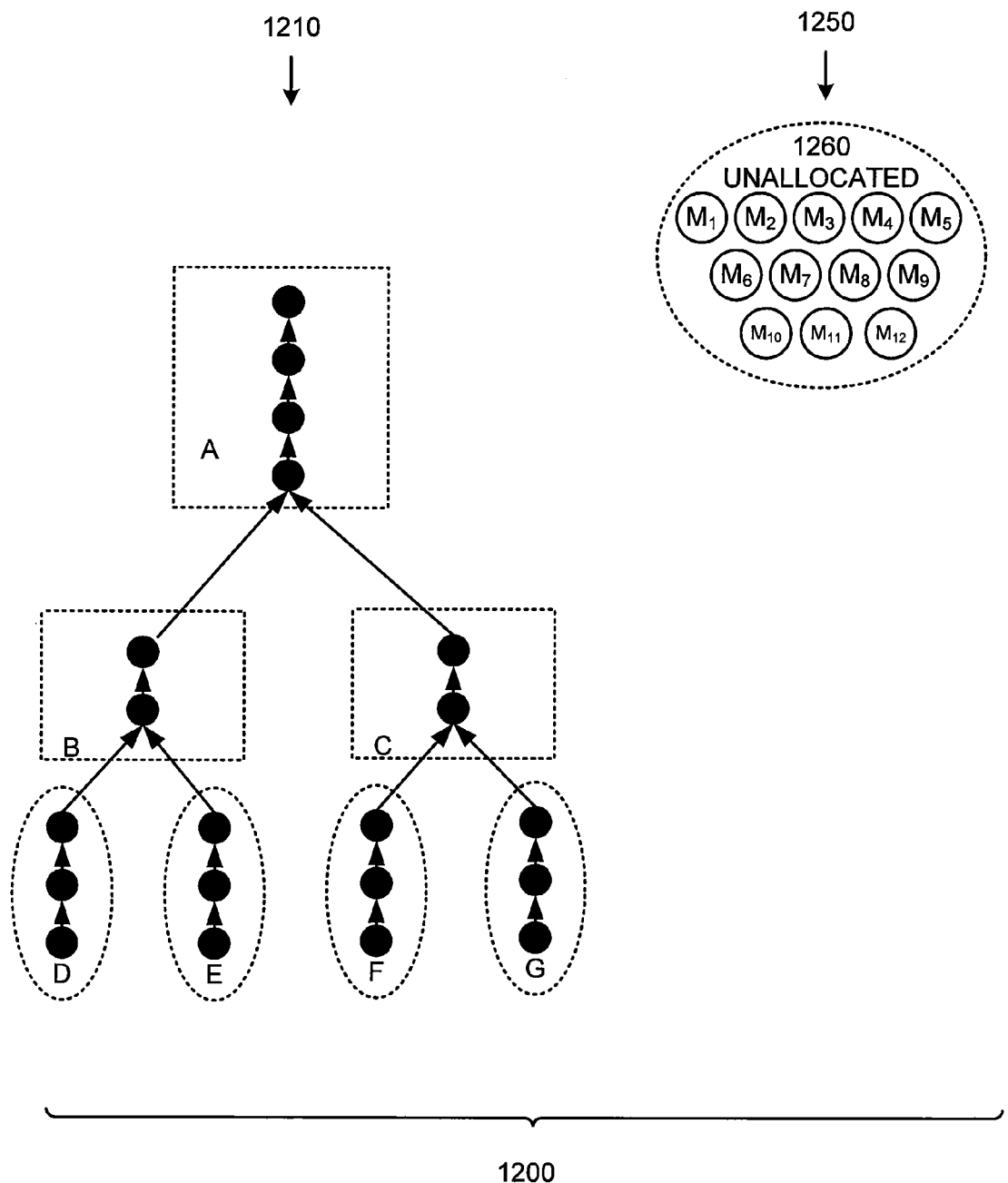
FIGS. 12, 13, and 14 are block diagrams of an exemplary query plan and computing resource allocations for the query plan.
Figure 13:
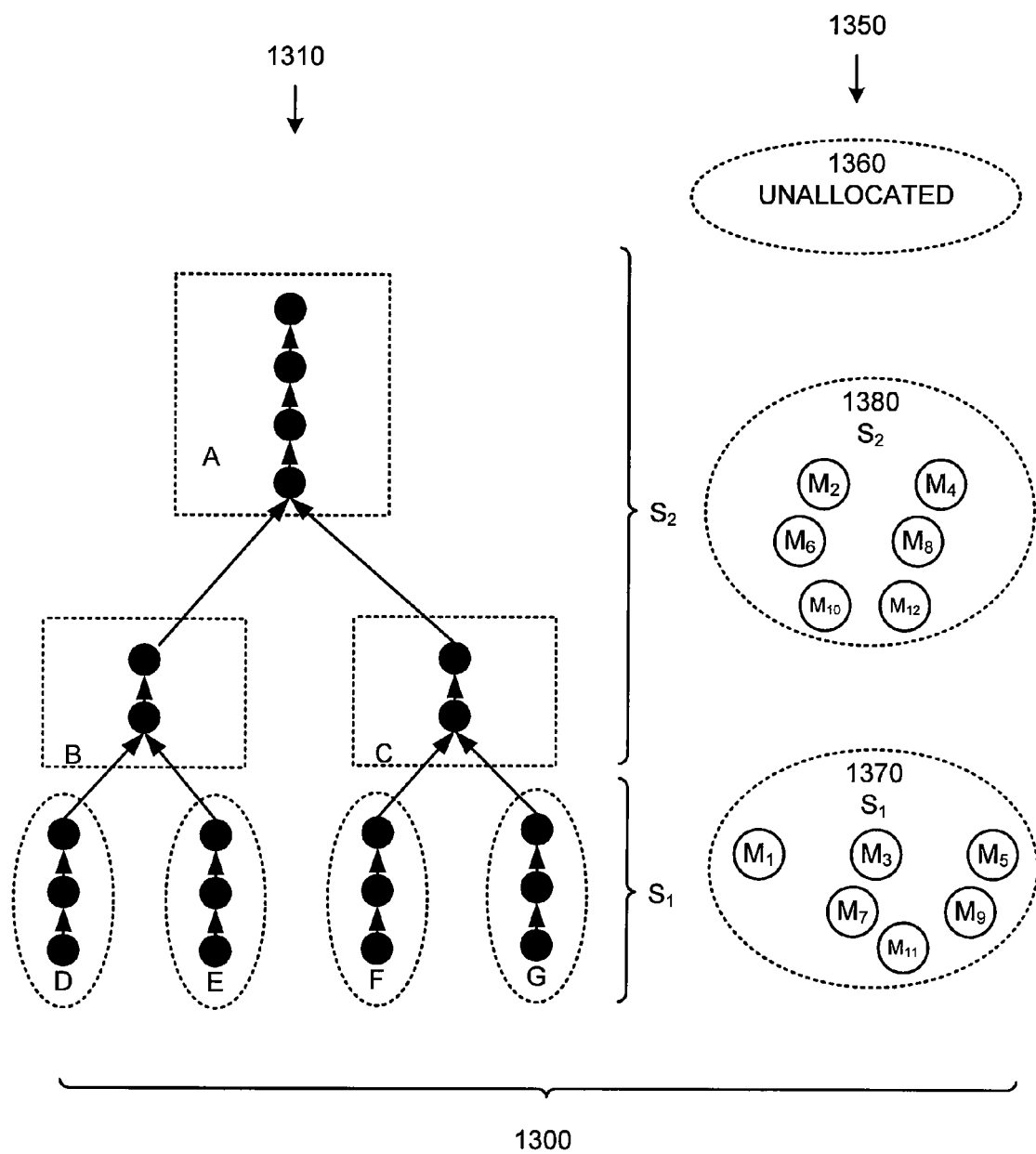
Figure 14:
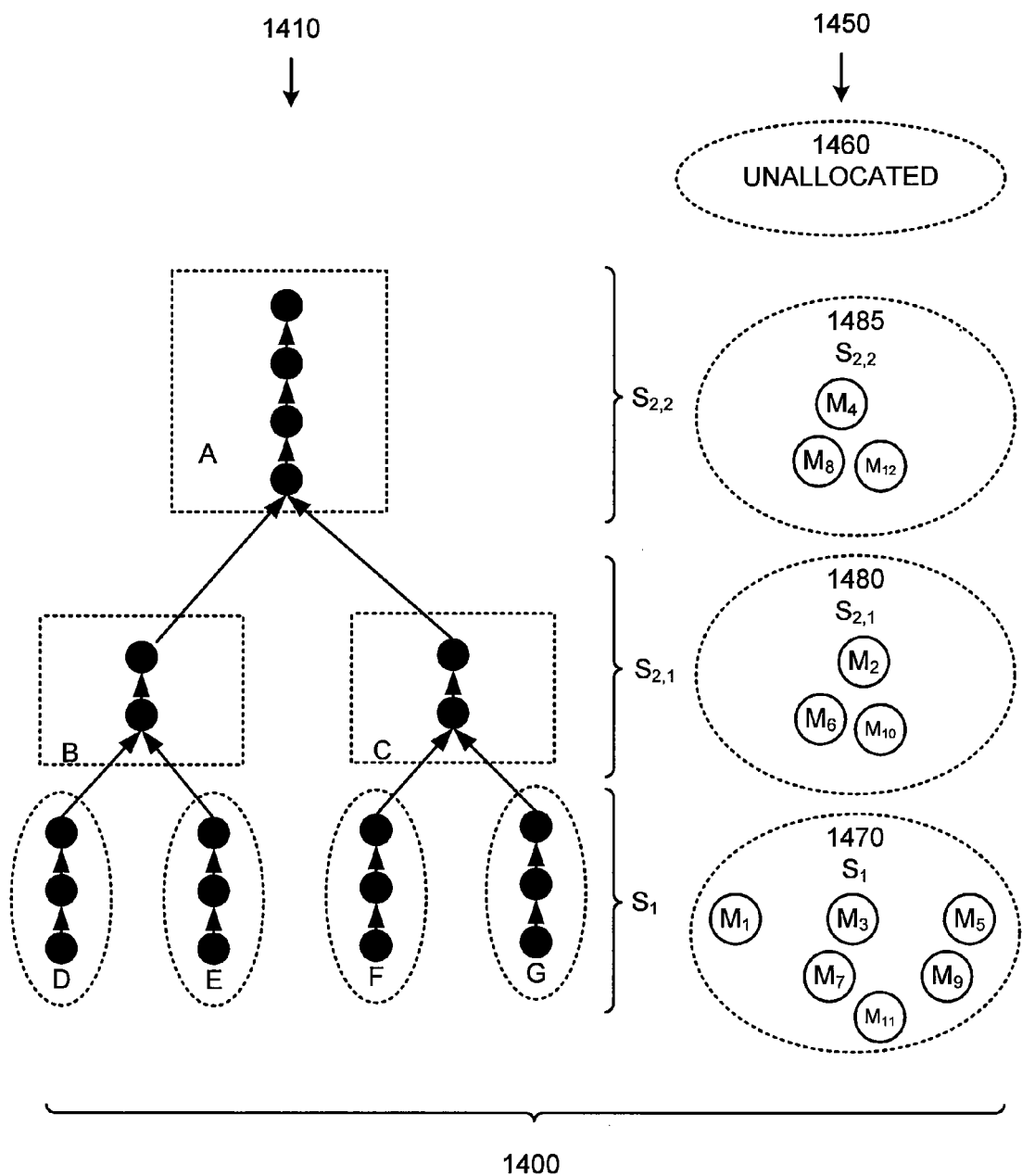

FIGS. 12, 13, and 14 are block diagrams of an exemplary query plan and show computing resource allocations for the query plan.

First, FIG. 12 shows an initial condition 1200 in which the allocation 1250 indicates that allocable resources are considered unallocated 1260 for the query plan 1210. Initially, the query plan 1210 is considered to be a single segment (e.g., with 3 levels).

Next, FIG. 13 shows that the query plan 1310 has been divided into two segment $S_1$ and $S_2$ (e.g., using any of the techniques described herein). Using an iterative application of the shortest path technique as described herein, resources $M_1$ and $M_2$ are assigned to segments $S_1$ and $S_2$, respectively. Subsequently, the remaining resources are assigned, two at a time, until the resources are designated as assigned to $S_1$ 1370 and $S_2$ 1380 as shown. No resources are designated as unallocated 1360.

Subsequently, FIG. 14 shows that the query plan segment $S_2$ has been further divided into $S_{2,1}$ and $S_{2,2}$. Again, using an iterative application of the shortest path technique as described herein, resources $M_2$ and $M_4$ are assigned to segments $S_{2,1}$ and $S_{2,2}$, respectively. Subsequently, the remaining resources provisionally allocated to $S_2$ are allocated to segments $S_{2,1}$ 1480 and $S_{2,2}$ 1485. Again, no resources are designated as unallocated 1460, and the resources provisionally allocated to $S_1$ 1470 remain so allocated.

Before allocating to $S_{2,2}$, a profitability analysis can be performed because the segment contains only one query sub-plan. Thus, the resources shown as allocated to $S_{2,2}$ are so allocated because it was found that performance would be improved by allocating them. If no profitability were predicted, the resources could be allocated instead to $S_{2,1}$.

Because $S_{2,2}$ has only one query sub-plan, the resources allocated to it can be considered finally allocated to the query sub-plan (i.e., A). For segment $S_{2,1}$, the resources allocated 1480 can be distributed between B and C using the techniques described herein to determine final allocation. Similarly, for segment $S_1$, the resources allocated 1470 can be distributed among D, E, F, and G using the techniques described herein to determine final allocation.

Example 23

Exemplary Performance Gain Evaluation Techniques

In any of the examples herein, during the allocation process, an evaluation of predicted performance gain can be performed to determine whether the allocation should be made or not; similarly it can be determined when to stop allocating resources based on predicted performance gain.

Example 24

Exemplary Performance Gain Evaluation Techniques: Single Sub-Plan in Segment In any of the examples herein, during the allocation process, when a segment has more than one sub-plan, resources can be allocated until the allocable machines are exhausted (e.g., all machines are allocated). If a segment has but a single sub-plan, performance gains can be checked before allocating an additional computing resource to the segment. The technique can be tuned by changing a predefined threshold $\delta$.

A profitability analysis can be done by evaluating predicted performance gains. Performance gains due to the addition of an additional resource j' can be predicted as:

$$x_{k,J'p,k,iter} + x_{kj'} = A_k$$

$$(T_{k,J'p,k,iter}/A_k) * x_{k,J'p,k,iter} = (t_{kj}/A_k) * x_{kj'}$$

where $T_{k,J'p+1, k\ iter}$ for pass p+1, is calculated as $T_{k,J'p+1, k\ iter} = (t_{kj'} * x_{kj'}/A_k)$ and $J'_{p+1} = (J'_p \cup j')$.

The first equation models the fact that the total amount of data processed in machines $j \in J'_{p, k, iter}$ and j' together by the sub-plan k cannot exceed $A_k$. The second equation models the scenario wherein the loads are equally balanced on the machines (e.g., all machines).

Thus, it is determined whether adding an additional resource for sharing the computational load is beneficial. If $(T_{k,J'p, k, iter} - ((T_{k,J'p, k, iter}/A_k) * x_{k, J'p, k, iter})) > \delta$, where $\delta$ is some predefined value, then machine j' is allocated to the segment k, otherwise not.

As described herein, profitability analysis can also be performed when distributing computing resources among query sub-plans of a single-level segment.

Example 25

Exemplary Segment Splitting Techniques

In any of the examples herein, any number of techniques can be used when splitting segments. Although not always possible, a goal can be to split the segment into two equal parts. For a given segment with a set of sub-plans, the sub-plan workload density can be computed. Then, the level workload density can be computed for respective levels in the segment.

Then, the summation of the level workload densities of the levels in the query plan segment are calculated. The query plan segment can then be divided at the point at which the summation of the level workload density of different consecutive levels (e.g., starting from the top) exceeds half of the summation (e.g., exceeds half of a total workload density for the query plan segment). If the dividing point is not found in this way, a fall back position can be used (e.g., divide the top level from the remaining levels or divide the bottom level from the remaining levels.)

Example 26

Exemplary Distribution of Computing Resources Among Segment Sub-Plans

In any of the examples herein, after allocation is made to segments (e.g., via a provisional allocation), the computing resources allocated to the segments can be distributed among the sub-plans of the segments (e.g., when the segment has only one level of sub-plans). Such distribution (sometimes called "final" allocation) can take a number of forms.

For example, a table can list the process cost values for respective permutations of sub-plans and computing resources (e.g., $k \in K_i$ and $j \in J_i$). Then, the minimum process cost value in the table can be found. If the minimum is achieved for the machine j=j' and for the sub-plan k=k', then j' is allocated to k'. j' is then removed from the resource list and k' from the sub-plan list; the corresponding entries are also deleted from the table.

An exemplary table is shown in Table A. In the example, 1.0 is the minimum process cost value, so machine 1 would be allocated to query sub-plan D.

TABLE A

| Permutations of Sub-Plans and Computing Resources | | | | | |
|---|---|---|---|---|---|
| | Resource 1 | Resource 2 | Resource 3 | Resource 4 | Resource 5 |
| Sub-plan D | 1.0 | 3.0 | 2.0 | 4.0 | 5.0 |
| Sub-plan E | 4.0 | 4.0 | 1.5 | 3.0 | 5.5 |
| Sub-plan F | 6.0 | 2.0 | 2.3 | 5.0 | 4.5 |
| Sub-plan G | 3.0 | 3.0 | 2.5 | 4.5 | 4.0 |

A normalized process cost can be used. For example, instead of using $t_k$, $t_{kj}/A_k$ can be used. Sub-plans lying near the root tend to process less data than the sub-plans lying near the base, so normalization (e.g., dividing by the estimated amount of data that the sub-plan processes) can lead to a superior result. Bottleneck computing resources can be identified and removed from consideration thereby.

The process of finding the minimum process cost value can be repeated over the remaining table. When one machine has been allocated to each of the sub-plans, the table of process cost values for $k \in K_i$ and the remaining machines in the list can be considered (e.g., by creating a fresh table). The minimum over the fresh table can then be located again. Again, the minimum can be achieved for the machine j=j" and for the sub-plan k=k". But this time, before j" is assigned to k", performance gain can be checked (e.g., using any of the techniques for performance gain checking described herein, such as that of Example 24).

Thus, in any of the examples herein, distributing computing resources among the query sub-plans of a single-level segment can comprise determining whether allocating further computing resources to the query sub-plan associated with the minimum process cost value is profitable, and responsive to determining that that allocating further computing resources to the query sub-plan is not profitable, ceasing to allocate further computing resources to the query sub-plan.

Example 27

Exemplary Loop Nature of Technique

The computing resource allocation technique can be considered as two loops. The outer loop is responsible for segment splitting. The maximum number of times this loop can be executed depends on the number of levels of the query plan (e.g., it can be repeated a maximum of l times).

The inner loop is responsible for resource allocation to the segments and can be repeated up to n times. The worst case complexity of the resource allocation action is, however $O(n^2)$. The query plan scheduling policy therefore has an algorithmic complexity of $O(l \times n^2)$. For complex queries involving a large number of joins (>10) and a bushy query plan (for distributed and grid databases bushy plans are more profitable than left deep query plans), l can be approximated as $\log_2 K$, where K is the total number of sub-plans in the query plan. In such instances the worst case time complexity can be approximated as $O(\log_2(K) \times n^2)$.

Example 28

Exemplary Allocations Involving Multiprocessor Computing Resources

In any of the examples herein, computing resource allocation can support multiprocessor computing resources (e.g., machines with more than one processor).

If a multiprocessor machine has r processors, an additional constraint can be imposed if r is less than the number of levels in the segment: only those sub-plans that belong to adjacent levels of the query plan can be allocated to the same multi-processor machine.

In light of the constraint, there can be two scenarios. First, when the number of processors r is less than the number of levels in the segment, after the segment is split using segment splitting as described herein, sub-plan allocation can be done by assigning a processor to the lower half of the segment and grouping the remaining (r-1) processors together and allocating to the upper half of the segment or vice-versa (e.g., assign a processor to the upper half and the remaining processors to the lower half of the segment).

Processors on the machine can be represented as respective pairs of nodes. The arcs connecting the processor nodes can represent the inter-processor communication cost (e.g., similar to the arc 950 of FIG. 9). The arcs connecting the processor nodes (e.g., of the multiprocessor computing resource) to the query segments can be the maximum $t_{kj}/A_k$ of the sub-plans bellowing to the other levels of the segment (e.g., starting form the position at which the parent segment was divided). The maximum can thus be used to represent the bottleneck in the system.

If the number of processors r is greater than or equal to the number of levels in the segment, the decision can be simplified. After the segment splitting action is carried out, the multi-processor system is allocated to both the child segments. The exact sub-plan to which the multi-processor system is allocated can be deferred until the point when one level corresponds to one sub-plan. The decision to allocate machines with single processors can be unaffected.

Example 29

Exemplary Techniques Addressing Data Locality

In any of the examples herein, data locality can be accounted for when allocating computing resources. For example, nodes representing computing resources at which data tables accessed by the query plan (e.g., via a tablescan) reside initially can be excluded from allocation considerations (e.g., they are not considered for allocation to a sub-plan other than the sub-plan involving the data table stored initially at the computing resource) to prevent the computing resources from being allocated to other query sub-plans. Such computing resources can be automatically (e.g., before computing resources are allocated via the graph) allocated to the query sub-plans that access the data tables residing at the computing resources. The techniques described herein can then be used to allocate the remaining computing resources.

Also, a special cost can be put in place to account for where the data-tables accessed by the query reside initially. Further, additional computing resources can be prevented from being allocated to the sub-plans involving automatic allocation.

For sub-plans belonging to the first level (i.e., l=1), $t_{kj}$ can be calculated as the summation of the cost of processing $A_k$ in machine j and the maximum of the sum of the cost of processing the input tuples in the machines hosting the respective tables (e.g., machines where the data tables reside) and the network shipment cost of the results from the machine hosting the table to machine j. For other sub-plans (e.g., sub-plans belonging to levels l, l>=2), the calculation of $t_{kj}$ can remain unchanged.

Example 30

Exemplary Parallelism

In any of the examples herein, the resource allocation techniques can address both pipelined parallelism and partitioned parallelism. For example, pipelined parallelism can addressed via evaluation of communication costs between the computing resources. Partitioned parallelism can be addressed via assigning a plurality of computing resources to a single query sub-plan of the query plan (e.g., the sub-plan is divided among the computing resources). Because allocation can be regulated by predicted performance gains as described herein, aspects of pipelined and partitioned parallelism can be addressed thereby as well.

Example 31

Exemplary Implementation of the Technologies

A heuristic technique can address the parallel query plan scheduling problem in data grids. The technique can exploit the binary tree structure of the query plan to determine profitable allocations. It can take care of multiple forms of parallelism while allocating resources to the sub-plans. Previous approaches to solving the problem tend to either ignore partitioned parallelism by focusing solely on pipelined parallelism wherein the communication cost is minimized, or lay more emphasis on partitioned parallelism at the cost of pipelined parallelism.

Both pipelining and partitioning mechanisms can be provided while attempting to optimize the allocation of resources to the query sub-plans. The technique is particularly well suited for allocation of resources to sub-plans in a bushy query plan, which is the most profitable form of query plan in distributed database query optimization.

Example 32

Exemplary Implementation of the Technologies: Introduction

Parallelism is a powerful and cost efficient solution for handling large amounts of data that exist in organizations. For example, parallel databases and distributed databases exploit parallelism for achieving speedups and performance gains. Furthermore, recent advances in networking technologies allow use of distributed computational nodes in parallel for processing huge amounts of data that are characteristic of declarative queries. Such a set-up is often called a 'data grid'.

Querying a data grid involves framing the query using a declarative language such as SQL, OQL, or the like. The declarative query is then transformed into a single node query plan through successive stages of well defined calculi and algebra. The single node query plan is then converted to a parallel plan by introducing exchange operators at specific locations of the plan. The different sub-plans of the parallel plan can then be executed concurrently on different processors for achieving speed-ups. FIG. 7 gives an example of a typical query plan 700 having multiple parallel plans.

One of the keys for faster evaluation of a query is an efficient query scheduler. However, the problem of allocating computing resources to different sub-plans of a distributed query plan is non-trivial. Load imbalances that may result from the inefficient allocation of resources to the query sub-plans may negate the benefits that could otherwise have been obtained by executing them in parallel. The problem can be exacerbated in a heterogeneous environment such as data grids and by the need to address multiple forms of parallelism.

Three different forms of parallelism can be identified for achieving parallel execution of sub-plans in the query graph: pipelined parallelism, partitioned parallelism, and independent parallelism. There is a need to minimize the communication cost together with the processing costs. The problem of efficient resource allocation can be considered for a given set of query sub-plans. More succinctly: Given a set of N distributed machines and a set of M sub-plans belonging to a bushy query plan (with N>>M), it can be determined which set of machines should be assigned to each of the different sub-plans such that the query execution time (also called the response time) is minimized.

The best possible match of the machines with the sub-plans that minimizes the cost of transferring tuples across the network along with the processing cost can be attempted to be found. However, most of the earlier works ignore either the partitioned parallelism or the pipelined parallelism and look at any one of the problems in isolation. Some, for example, attempt incorporating partitioned parallelism in a limited way only. Similarly, others lay more emphasis on partitioned parallelism. The special characteristics of the tree structure of the bushy query plan can be exploited to devise techniques that are more specifically suited for allocation decisions in distributed databases.

Example 33

Exemplary Implementation of the Technologies: Solution Approach

The technique described herein can employ efficient heuristics, since the problem is theoretically intractable. An acceptable solution should be able to scale up well with the number of machines as well as with the number of sub-plans. In the example, the methodology for querying a data-grid can be the one adopted in Gournaris et al., "A novel approach to resource scheduling for parallel query processing on computational grids," *Distributed Parallel Databases* vol. 19, pp. 87-106, 2006, 20 pages. Thus, the querying model can be built upon the polar* and OGSA-DAI/DQP systems introduced therein.

Example 34

Exemplary Implementation of the Technologies: Notations

A "sub-plan" can refer to portions of a parallel query plan that can be executed concurrently. Different sub-plans of a parallel query plan are organized into Levels depending upon the producer-consumer relationship. For the example query in FIG. 7, level 0 contains the sub-plans D, E, F and G and level 1 contains sub-plan B and C and so on. A consecutive set of the levels together make up a Segment. Initially, the entire query plan can be considered to be one single segment. Multiple instances of a sub-plan that act on different portions of the data set can be denoted as "Partitions."

In the above, difference can be noted, in particular, between the terms "sub-plan" and "partition." Thus, "sub-plan" refers to the different portions of the parallel query plan and "partition" refers to the different portions of the data set. Additionally, in subsequent discussions distinction must be noted between the query graph and the scheduling graph. "Query graph" denotes a query plan and is of the form shown in FIG. 1, while the construction of the scheduling graph will be outlined in subsequent discussion. An exemplary list of notations is outlined in Table 1.

TABLE 1

Exemplary Notations

| | |
|---|---|
| i | Segment identifier. |
| j | Machine (also called computational node) identifier. |
| k | Sub-plan identifier. |
| l | Level identifier. |
| p | Pass identifier. |
| iter | Iteration identifier. |
| $J_i$ | Set of machines allocated to segment i. |
| $K_i$ | Set of sub-plans belonging to segment i. |
| $n_{ij}$ | Represents processing of segment i in machine j. |
| $t_{kj}$ | Total time (in seconds) to process sub-plan k in machine j. Sub-plan k can belong to only one segment. |
| $A_k$ | Amount of data, in bytes, to be processed by sub-plan k. |
| $Cap_{ij}$ | $\Sigma_{k \in K_i} A_k / \Sigma_{k \in K_i} t_{kj}$ Represents execution speed of segment i on machine j. |
| $C_{ij}$ | =1/$Cap_{ij}$. Represents the cost of the arc connecting the segment i to the node $n_{ij}$. |
| $S_k$ | Selectivity of sub-plan k. |
| $B_{jj'k}$ | Amount of data to be sent from machine j to j' if the whole of a sub-plan $A_k$ is processed in j, $B_{jj'k} = (A_k * S_k.)$ |
| $BW_{jj'}$ | Bandwidth of the network connecting the nodes j and j'. |
| $D_{jj'}$ | Distance between nodes j and j'. |
| $t_{jj'k}$ | Total time to send $B_{jj'k}$ across the network from computational node j to computational node j' assuming no network congestion. $t_{jj'}$ depends on $BW_{jj'}$ and $D_{jj'}$. |

TABLE 1-continued

Exemplary Notations

| | |
|---|---|
| $K_{jj'}$ | Congestion factor of the network connecting nodes j and j'. $K_{jj'} > 1$. |
| $Net_{jj'}$ | Average capacity of the arc connecting the computational resource j to the computational resource j'. $Net_{jj'} = \Sigma_k B_{jj'k}/(K_{jj'} * \Sigma_k t_{jj'k})$. $Net_{jj'}$ is assumed to be symmetrical. |
| $N_{jj'}$ | $= 1/Net_{jj'}$ represents the average inter-machine communication cost. |
| $J'_{p,k,iter}$ | Set of machines allocated for processing a sub-plan k at the start of pass p belonging to iteration number iter. |
| $T_{k,J'p\,k\,iter}$ | Time to process $A_k$ when $J'_{p,k,iter}$ set of machines has been allocated. |
| $x_{k,J'p\,k\,iter}$ | Total amount of data belonging to sub-plan k that is processed in the set of machines $J'_{p,k,iter}$. |

$A_k$ can represent the total amount of data to be processed by the sub-plan k. $t_{kj}$ can be the time required to process the dataset $A_k$ on machine j. $t_{kj}$ can be calculated as the summation of the processing time of the operators, excluding the 'exchange' operator, that make up the sub-plan.

For example the cost of processing sub-plan A of FIG. 7, on machine j is the cost of processing the project operator on machine j plus the cost of processing the aggregate operator on machine j plus the cost of processing the join operator on machine j.

A model adopted from that described in Sampaio et al, "Validated cost models for parallel OQL query processing", Proc. of OOIS, pp. 60-75, 2002 can be used.

The model can be used to estimate the processing cost of the different operators. The model can be quite detailed and well validated and estimates the overall query completion time by estimating the cost of each individual operator that make up the query. Thus, the problem of accounting for the network capacity twice can be avoided. $A_k/t_{kj}$, therefore, can represent the amount of data that is processed by the machine per unit of time $t_{kj}$ for the sub-plan k and hence can be a measure of the individual processing capacity. $\Sigma_k A_k/\Sigma_k t_{kj}$, hence, can represent the average capacity ($Cap_{ij}$) of processing k for machine j. $C_{ij}$ can therefore be calculated as $1/Cap_{ij}$ and represent the average processing cost. In other words, $C_{ij}$ can represent, on an average, the time it will take for 1 byte of data to be processed on the $j^{th}$ machine. Other terms can be interpreted similarly. Thus, on an average, the total time (cost) for 1 byte of data to move from node 1 to node 2 is the summation of the computation time (cost) of 1 byte of data at node 1, the computation time (cost) of 1 byte of data at node 2 and the time (cost) to move 1 byte of data from 1 to 2.

A measure called the "sub-plan workload density" can be calculated as the maximum of the selectivity of the operators that comprise the sub-plan. As the workload of the sub-plan is governed by the maximum of the filtering abilities of the operators that make up the sub-plan, it is appropriate to choose the maximum of the selectivity of the operators as sub-plan workload density. Another measure called the "level workload density" can be calculated as the maximum of the sub-plan workload density of the sub-plans that make up the level. This is a rough estimate of the amount of data flowing out of a level and is determined by the maximum of the sub-plan workload density.

The technique to be explained in the next section is an iterative procedure. Within an iteration, there are a number of passes. In each pass, p, of iteration, iter, the allocation of only two machines is decided. Then, $J'_{p,k,iter}$ is the set of machines allocated for processing a sub-plan k at the start of pass p belonging to iteration, iter and $x_{k,J'p\,k\,iter}$ represents the total amount of data ($x_{k,J'p\,k\,iter} \leq A_k$), that is processed in the machines that belong to the set $J'_{p,k,iter}$. $T_{k,J'p\,k\,iter}$ denotes the total time required to process the $x_{k,J'p\,k\,iter}$ amount of data in the set of machines belonging to $J'_{p,k,iter}$. The technique can be based on the observation that the structure of a query plan is a binary tree. The observation can be exploited when allocating machines to the sub-plans.

Example 35

Exemplary Implementation of the Technologies: Outline of Technique

The resource allocation problem can be addressed by first splitting the query graph into two segments by completely disregarding the number of sub-plans that the parallel plan might contain. An exemplary procedure for splitting a segment into two parts is outlined below. Resources are then assigned to the two resulting segments using a resource allocation scheme as described below.

After the initial resource allocation is complete, each of the segments are again split into two separate segments; the machines associated with a parent segment (determined in the earlier action) are assigned to the newer segments carved out of the parent segment using the segment splitting scheme. This process of splitting a segment into two segments and thereafter distributing the resources associated with the parent segment to each of the two new child segments is done recursively till a stopping criterion is satisfied.

The technique can be summarized as:

Action 1: Segment splitting—Split the segment (Initially, the whole of the query graph is considered to be one segment).

Action 2: Resource allocation:

Action 2a: Allocate one resource to each of the two segments.

Action 2b: Repeat Action 2a till further addition of a computational resource does not lead to performance gains or till all the machines have been allocated. The performance gain evaluation methodology is described below.

Action 3: For each of the segments identified in Action 1, repeat Actions 1 and 2 till the segment has no more than one level.

Action 4: For each of the segments having one level but a number of sub-plans, distribute the machines associated with a segment to the sub-plans contained in the segment. A detailed discussion on distribution of machines is presented in below.

Example 36

Exemplary Implementation of the Technologies: Action 1(Segment Splitting)

In an iteration of the technique, a segment is selected to split and split it into two (possibly) equal parts. The sub-plans that are part of the segment are first organized into levels. A sub-plan at level l-1 feeds a sub-plan at level l. For a given segment with a set of sub-plans, the sub-plan workload density is computed. The level workload density is then computed for each of the levels in the segment. Thereafter, the summation of the level workload density of the levels (e.g., all levels) in the query graph is calculated. Then, the graph is divided into two at the point where the summation of the level workload density of different consecutive levels, starting from the top, exceeds half of the summation calculated earlier. Dividing the graph in such a manner can have two advantages—first, it allows consideration of segments with complete sub-plans only, and second, a certain amount of aggregation is achieved.

Example 37

Exemplary Implementation of the Technologies: Action 2 (Resource Allocation)

In each pass of the iteration only one resource is allocated (e.g., provisionally) to each of the two segments determined by Action 1 of the technique. In any given pass, for allocating resources to the two child segments generated by splitting the parent segment, the resources to be allocated to the two child segments in two stages are laid out as shown in FIG. 9.

Each resource is represented using two nodes in the graph—one for each of the stages. Thus, the nodes $n_{S1,1}$ and $n_{S2,1}$ essentially represent one machine. The two end vertices in the figure, acting as a source and a sink, represent the two child segments of the parent segment. Each segment consists of a number of complete sub-plans. The circular nodes, $n_{ij}$, represent the average processing ability of segment i in machine j. The directed arcs connecting a segment i to a node $n_{ij}$, represent the average cost of processing the data by the sub-plans belonging to the segment i. $\Sigma_k A_k / \Sigma_k t_{kj}$ therefore represents the average capacity ($Cap_{ij}$) of processing k for machine j. The arc cost, $C_{ij}$, ($=1/Cap_{ij}$) thus represents the average cost of the arc connecting segment i to the node $n_{ij}$.

The arc costs can be useful for a variety of reasons. For example, it is more often the case that one sub-plan acts upon the output produced as a result of processing by another sub-plan. Consequently, the exemplary sub-plan belonging to segment $S_2$ in FIG. 9 tends to process far less amount of data than the sub-plan belonging to segment $S_1$. Thus, if only the $t_{kj}$ values were considered, it would result in an unbalanced graph. Dividing $t_{kj}$ by $A_k$ allows normalization of the $t_{kj}$ values and correct identification of the bottlenecks. Second, since the actual allocation of the resources to the sub-plans within a segment are deferred until there is one-to-one correspondence between the segment and the level (see section 2.2.4), only the average values $\Sigma_k t_{kj}/\Sigma_k A_k$, $k \in K_i$ are considered.

Once a scheduling graph is constructed using the above scheme (e.g., FIG. 9), the problem then reduces to finding the shortest path from the source to the sink in the graph. The computational resources that lie on the shortest path are allocated to the two segments. The resources are deleted from the graph, and the shortest path is determined once again in the residual graph. Resources continue to be allocated this way to the two segments until addition of any further resource to the segments is not beneficial or the number of machines is exhausted altogether.

Example 38

Exemplary Implementation of the Technologies: Action 3 (Performance Gain Evaluation Methodology)

If both the segments $S_1$ and $S_2$ (e.g., determined in Action 1, above) have a number of sub-plans, then all the machines in the resource list (e.g., determined in Action 2, above) are allocated to either $S_1$ or $S_2$. However, when a segment has only one sub-plan, then performance gains are due to the addition of an additional resource, say j', are checked as:

$$x_{k,J'p,k,iter} + x_{kj'} = A_k$$

$$(T_{k,J'p,k,iter}/A_k)^* x_{k,J'p,k,iter} = (t_{kj}/A_k)^* x_{kj'}$$

where $T_{k,J'p+1, k, iter}$ for pass p+1, is calculated as $T_{k,J'p+1, k, iter} = (t_{kj'}^* x_{kj}/A_k)$ and $J'_{p+1} = (J'_p \cup j')$.

The first equation models the fact that the total amount of data processed in machines $j \in J'_{p, k, iter}$ and j' together by the sub-plan k cannot exceed $A_k$. The second equation models the scenario wherein the loads are equally balanced on all the machines. This way it is determined whether adding additional resource for sharing computational load is beneficial. If $(T_{k,J'p, k, iter} - ((T_{k,J'p, k, iter}/A_k)^* x_{k, J'p, k, iter})) > \delta$, where $\delta$ is some predefined value, then the machine j' is considered as a candidate for allocation to the segment k, otherwise not.

Example 39

Exemplary Implementation of the Technologies: Action 4 (Resource Allocation for Sub-Plans)

For distributing machines associated with a segment having only one level but a number of sub-plans, a table that lists the $t_{kj}/A_k$ value for $k \in K_i$ and $j \in J_i$ is considered and the minimum $t_{kj}/A_k$ value in the table is found. If the minimum is achieved for the machine j=j' and for the sub-plan k=k', then j' is allocated to k'. j' is then removed from the resource list and k' is removed from the sub-plan list; the corresponding entries are deleted from the table. The process of finding the minimum $t_{kj}/A_k$ value is repeated over the remaining table.

When one machine has been allocated to each of the sub-plans, the table of $t_{kj}/A_k$ values for $k \in K_i$ and the remaining machines in the list are considered. The minimum is again located over the fresh table. Again let this minimum be achieved for the machine j=j" and for the sub-plan k=k". But this time, before assigning j" to k", performance gain is checked as done for allocating machines to a segment having one level and one sub-plan (i.e. Action 3, above).

The computing resource allocation technique can be considered as two loops. The outer loop is responsible for segment splitting. The maximum number of times this loop can be executed depends on the number of levels of the query plan (e.g., it can be repeated a maximum of l times).

The inner loop is responsible for resource allocation to the segments and can be repeated up to n times. The worst case complexity of the resource allocation action is, however $O(n^2)$. The query plan scheduling policy therefore has an algorithmic complexity of $O(l \times n^2)$. For complex queries involving a large number of joins (>10) and a bushy query plan (for distributed and grid databases bushy plans are more profitable than left deep query plans), l can be approximated as $\log_2 K$, where K is the total number of sub-plans in the query plan. In such instances the worst case time complexity can be approximated as $O(\log_2(K) \times n^2)$.

Example 40

Exemplary Execution

In an exemplary execution of the techniques described herein, the query plan 700 of FIG. 7 is divided into two segments: $S_1$ (with query sub-plans B-G) and $S_2$ (with query sub-plan A). Subsequently, when resources are allocated to $S_2$, a profitability analysis is performed (e.g., responsive to determining that $S_2$ has but one query sub-plan).

Segment $S_1$ is subsequently divided into segment $S_{1,1}$ (with query sub-plans D-G) and segment $S_{1,2}$ (with query plans B and C), and the resources allocated to $S_1$ divided between the two child segments.

Resources provisionally allocated to segments $S_{1,1}$ and $S_{1,2}$ can then be finally allocated (e.g., distributed within the query sub-plans of the respective segments).

The allocation to the one-query-sub-plan segment $S_2$ can be considered either a provisional allocation that becomes the final allocation, or provisional allocation can be considered skipped. Although the allocation is called "final," other tools or mechanisms can continue to refine or modify the final allocation as desired.

Example 41

Exemplary Feature: Addressing Data Locality

It is often the case that data distribution is fixed. That is, data is initially created at a given location. To take data layout into account, the costs in the scheduling graph can be suitably modified to reflect the data locality. N can be the total number of machines, of which {n} is the set of machines in which data-tables accessed by the query reside initially. The scheduling decision in such a case involves allocating N-{n} machines to the k sub-plans, k belonging to levels l, l≠0.

For all sub-plans belonging to the first level (i.e. l=1) $t_{kj}$ can be calculated as the summation of the cost of processing $A_k$ in machine j and the maximum of the sum of the cost of processing the input tuples in the machines hosting the respective tables (i.e. machines where the data-table resides) and the network shipment cost of the results from the machine hosting the table to machine j. For all other sub-plans, that is sub-plans belonging to levels l, l>=2, the calculation of $t_{kj}$ remain unchanged. For example, referring to FIG. 7, if plans D, E, F and G need to access data-tables stored initially in machines, say 1, 2, 3 and 4, respectively, then the four machines are excluded from allocation considerations (e.g., they are not considered for allocation to a sub-plan other than the one involving the data table stored initially at the machine). The values of $t_{kj}$ for sub-plans B and C (i.e., the penultimate level) on the remaining machines is then suitably modified.

Considering first sub-plan B, $t_{kj}$ for sub-plan B on machine j (j≠1,2,3,4) is then calculated as the sum of the cost of executing $A_B$ on machine j plus the maximum of {cost of executing sub-plan D on machine 1+cost of transporting tuples from machine 1 to machine j, cost of executing sub-plan E on machine 2+cost of transporting tuples from machine 2 to machine j}. However, the $t_{kj}$ values for sub-plan A are not modified as it belongs to a level l>1. Additionally, sub-plans having the join operator are placed on the machines (hosting the database relations) with larger input ($A_k*S_k$). With this modified cost structure for the sub-plans belonging to level 1, and the additional refinements, the techniques described herein can otherwise work in the usual manner.

Example 42

Exemplary Feature: Multiprocessor Systems

There may be a number of multi-processor systems in the pool of machines that need to be allocated. Consider a multi-processor machine with r processors that need to be allocated. If r is less than the number of levels in the segment, then an additional constraint can be imposed—only those sub-plans that belong to the adjacent levels of the query plan can be allocated to the same multiprocessor machine. Depending upon this there can be two possible scenarios:

I. The number of processors r is less than the number of levels in the segment: After the segment is split using the segment splitting action, there are two possible choices for the sub-plan allocation—(a) Assign one processor to the lower half of segment and group the remaining (r-1) processors and allocate the group to the upper half of the segment. (b) Group (r-1) processors and assign the group to lower half of segment and assign the only remaining processor to the upper half of the segment.

Figure 15:
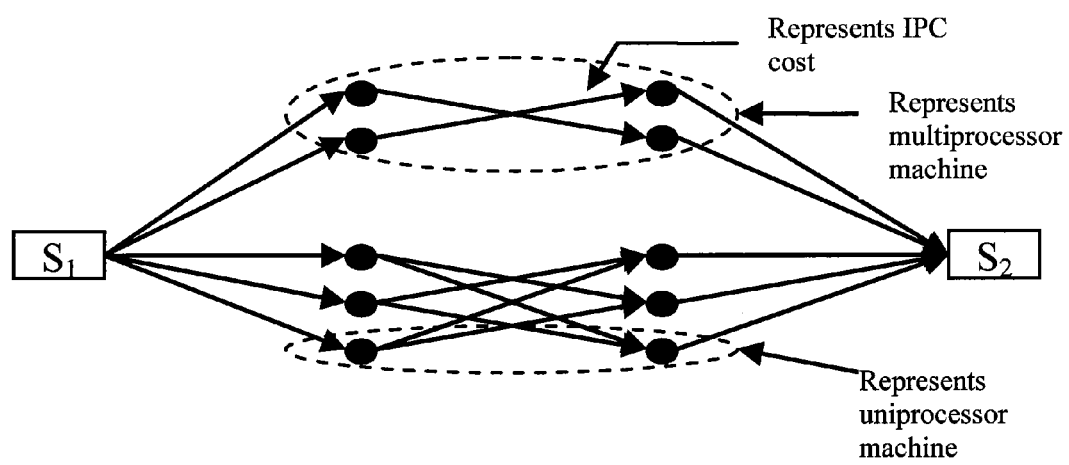
FIG. 15 is an exemplary graph representation of a computing resource allocation problem including multi-processor computing resources.

In the graph these are depicted as four separate nodes as shown in FIG. 15. The nodes $n_{s1,1}$ and $n_{s2,1}$ represents case(a) while the nodes $n_{s1,2}$ and $n_{s2,2}$ represents case (b). $n_{s1,1}$ $n_{s2,1}$, $n_{s1,2}$ and $n_{s2,2}$ together represent one single multi-processor machine. The directed arc connecting the two processor nodes $n_{s1,1}$ to $n_{s2,2}$ and $n_{s1,2}$ to $n_{s2,1}$ represent the inter-processor communication cost. The case $S_1$-$n_{s1,1}$-$n_{s2,2}$-$S_2$ represents the situation when a processor is allocated to $S_1$ and the remaining r-1 processors is allocated to $S_2$. The question then is, "What is the cost of the directed arc from $n_{s2,1}$ to $S_2$?" Since the number of levels is less than r this can be resolved by observing the fact that only those sub-plans that belong to adjacent levels of the query plan are possible candidates for allocation to the processors belonging to the same machine; and since $S_1$ has already been allocated one processor in the machine, all the remaining processors in the machine should be allocated to the consecutive r-1 sub-plans belong to $S_2$, starting from the point where the graph is divided. Hence, the cost of the directed arc from node $n_{s2,1}$ to $S_2$ can be calculated as the maximum of $t_{kj}/A_k$ of the sub-plans belonging to the first (r-1) levels of the segment $S_2$ starting from the position at which the parent segment was divided. Similarly, the cost of the directed arc from node $S_1$ to $n_{s1,2}$ is calculated as maximum of $t_{kj}/A_k$ of the sub-plans belonging to the last (r-1) levels of the segment $S_1$. The maximum value can be taken, as it represents the bottleneck in the system.

II. The number of processors r is greater than or equal to the number of levels in the segment: In this scenario, the decision is simplified as the number of processors exceed the number of levels in the parent segment. So after the segment splitting action is carried out, the multi-processor system is allocated to both the child segments carved out of the parent segment. The exact sub-plan to which multi-processor system is allocated is deferred until one level corresponds to one sub-plan. The decision to allocate machines with single processors can be done in the usual manner.

Example 43

Exemplary Experimental Results

A query plan scheduler implemented as described herein was evaluated against the scheduler proposed in Gournaris et al., "A novel approach to resource scheduling for parallel query processing on computational grids," *Distributed Parallel Databases* vol. 19, pp. 87-106, 2006, 20 pages ("Gournaris") and other schedulers proposed in the distributed and parallel databases literature. The scheduler tested was implemented in Java 1.4.2.05 and executed in a Pentium-4, 2.8 GHz processor with 1 GB RAM.

For evaluating the scheduler, the data used in carrying out the experiments in Gournaris were worked with primarily. Measuring the response time of the queries when executed against large datasets and a pool of heterogeneous machines was of interest. For calculating the response time, simulation was used. The scenario under consideration involves two compute intensive queries involving one and five joins, respectively. The queries retrieve data from two and six remotely located tables. Each table contains 100,000 tuples. Two data sets were considered: (1) Set_A—the average tuple size is 100 bytes and (2) Set_B—the average tuple size is 1 KB. All the joins have a low selectivity of $10^{-5}$. Joins are implemented using a single pass hash join. The rate of retrieving data from machines hosting the databases is 1 MB/sec. It requires 30 microseconds on an average to perform a join operation between two tuples. The connection speed between any two nodes is 600 KB/sec on an average.

In the experimental results, it is assumed that the connection speed is a property of both the sender and the receiver. The machines are assumed to have enough memory to hold the hash table in case the memory is allocated to the subplan. It is assumed that it is not possible to parallelize the table-scans and that replication is disallowed.

In the experiments the two join queries were evaluated over datasets—Set_A and Set_B, when the number of extra computational nodes varies up to a maximum of 20. The test environment is such that 25% of the machines have double the CPU power and double the connection speed (i.e. a join operation between two tuples can be completed in 15 microseconds and connection speed is 1.2 MB/sec), 25% have double the CPU power and half the connection speed (i.e. a join operation between two tuples can be completed in 15 microseconds and connection speed is 300 KB/sec), 25% have half the CPU power and double the connection speed, 25% have half the CPU power and half the connection speed. The experiment is repeated for three different threshold values. The scheduling strategy was compared with six other scheduling strategies: (i) the heuristic scheme proposed in Gounaris (ii) when all the machines in the machine pool are used with work load properly balanced as is normally done in parallel database management systems (iii) when partitioned parallelism is not taken into account (iv) only the machines that hold data are used for all computations (v) only the two most powerful machines available in the pool are used for partitioning the data and performing the join operations and (vi) all machines are used evenly such that all the machines, irrespective of their processing capabilities, get equal number of tuples.

Figure 16:
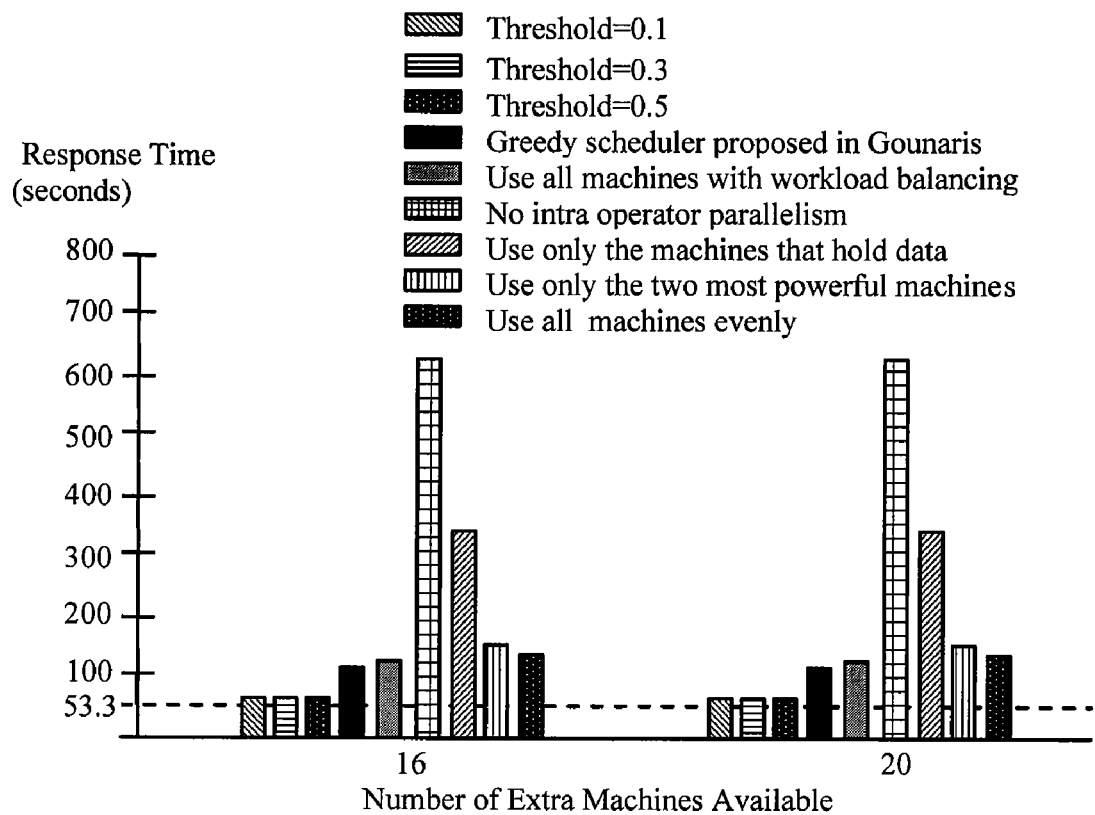
FIGS. 16, 17, 18, and 19 are charts showing comparisons of resource allocation strategies for various joins and data sets.

FIGS. 16, 17, 18, and 19 compare the scheduling strategy described herein with the different strategies proposed in the literature. The dashed lines in each of these figures represent the cost of non-parallelizable scans. E.g. 53.3 seconds in FIG. 16 is the cost to retrieve data from the machine hosting the tables accessed in the query. As in Gounaris, the tested scheduling policy is tunable and depends on the value of the threshold. There is a trade-off between the execution time of the algorithm and the benefits due to increased parallelism. Lower values of threshold may result in reduced response times of a query due to an increase in the number of machines employed. The benefit of the increased parallelism, however, comes at the cost of an increase in algorithm execution time. From the figures it can be observed that (i) the scheduler proposed in the current paper judiciously allocates machines to the sub-plans thereby reducing the overall response time of the queries when compared with most of the other scheduling strategies. (ii) The parallelization cost for the proposed scheduler is considerably lower than when no intra operator parallelism is employed or when only the machines that host the databases are used for performing the processing operations. (iii) The tested scheduling approach outperforms the policies that use only a few powerful machines in the pool of available machines with complete disregard to the data distribution policies. (iv) The scheduling methodology outlined herein performs exceedingly well against the policies which adopt naïve data distribution techniques (e.g. when all machines are evenly used). (v) The response times of the queries due to the scheduling scheme herein is comparable to Gounaris. In most of the cases the response times is lower than in Gounaris.

FIG. 16, shows a comparison of scheduling strategies for 1-Join query with Set_A.

Figure 17:
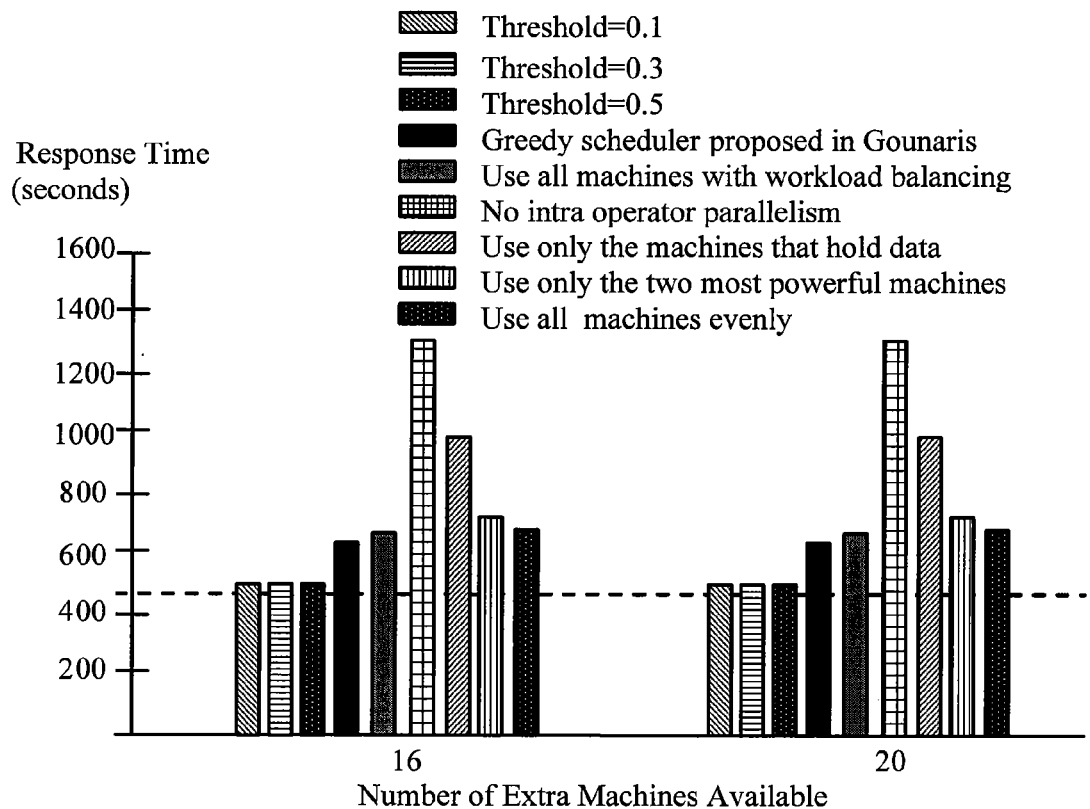

FIG. 17 shows a comparison of scheduling strategies for 5-Join query with Set_A.

Figure 18:
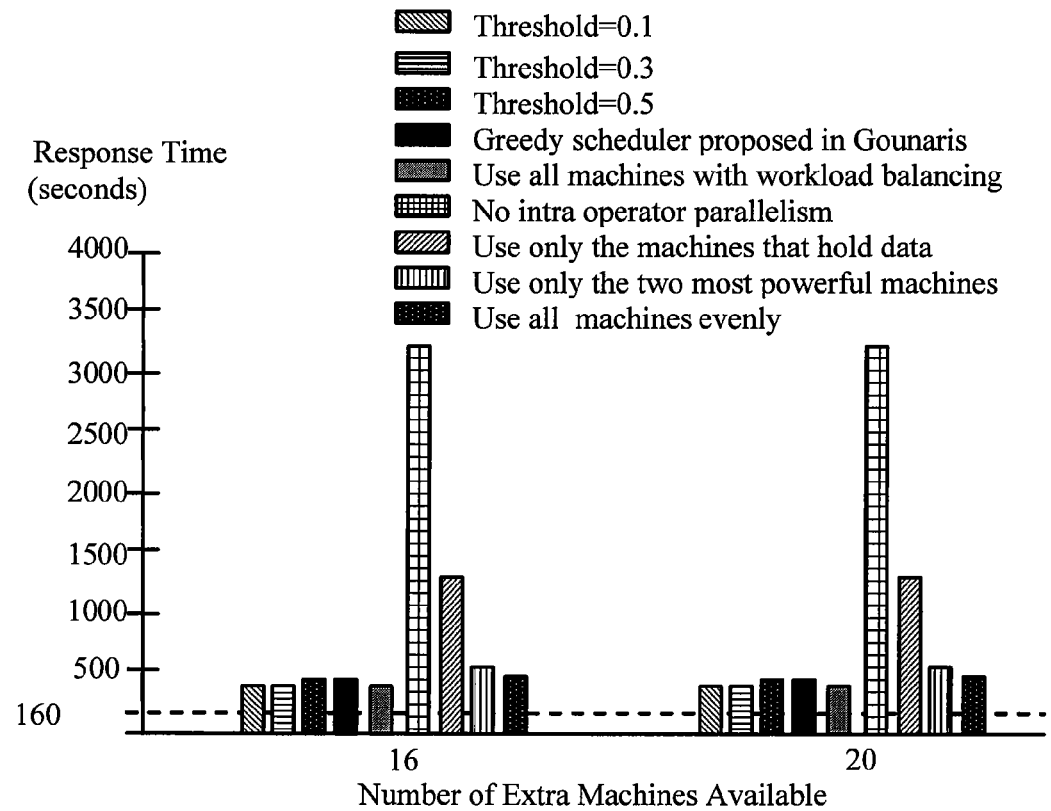

FIG. 18 shows a comparison of scheduling strategies for 1-Join query with Set_B.

Figure 19:
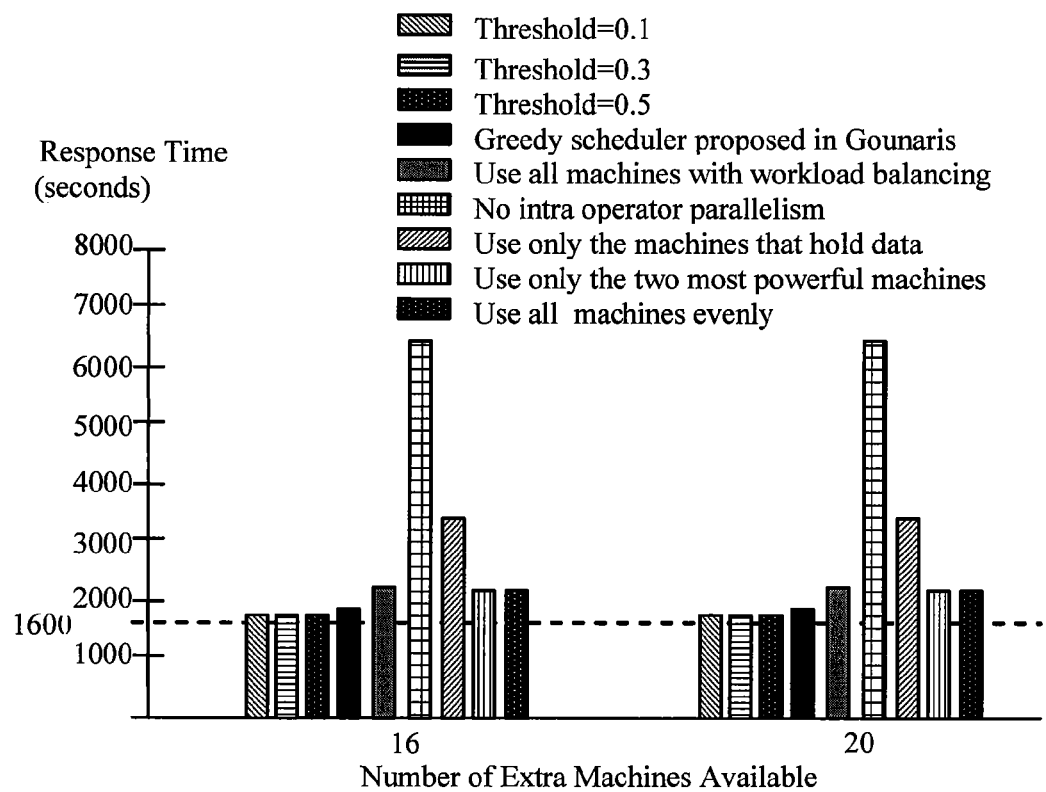

FIG. 19 shows a comparison of scheduling strategies for 5-Join query with Set_B.

Due to the space limitations, the charts are limited to only two cases—one when the number of extra machines available is 16 and second when the number of extra machines available is 20.

FIGS. 20, 21, 22, and 23 show the variation in response times with the number of extra computational nodes available for the cases when the 1-join query and the 5-join query are executed against the two datasets—Set_A and Set_B. It can be easily verified that the response times in each of these cases is lower than the response times mentioned for the corresponding cases Gounaris.

Figure 20:
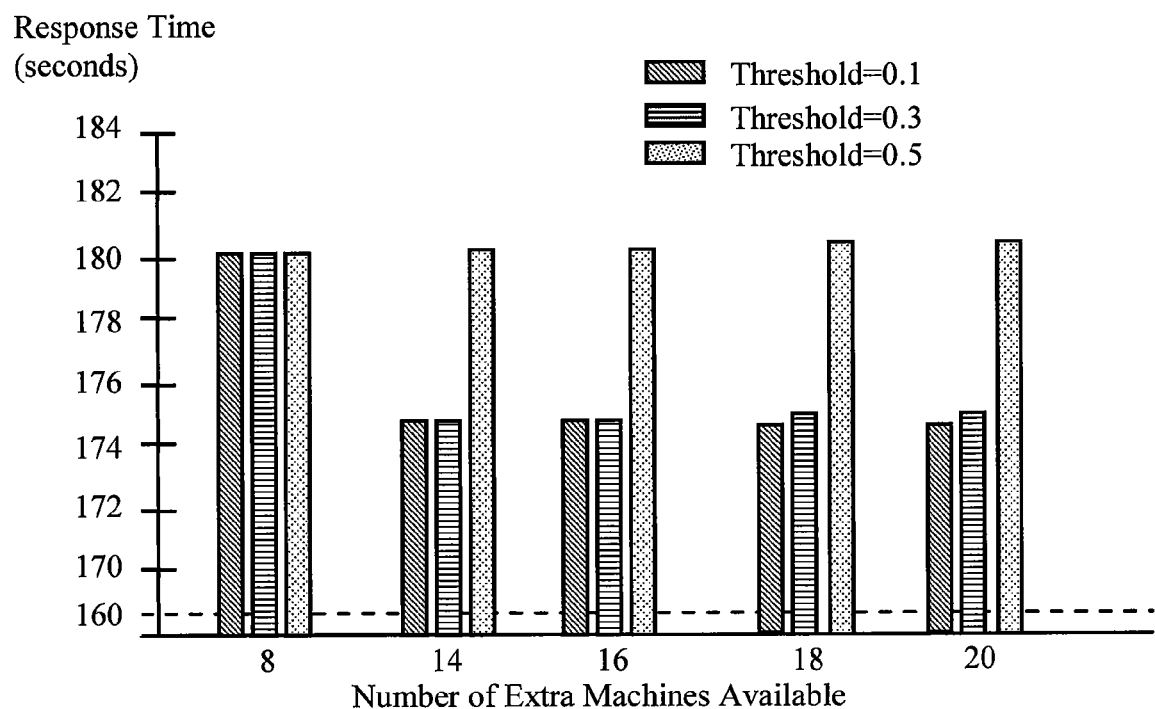
FIGS. 20, 21, 22, and 23 are charts showing comparisons of response time for various joins and data sets.
Figure 21:
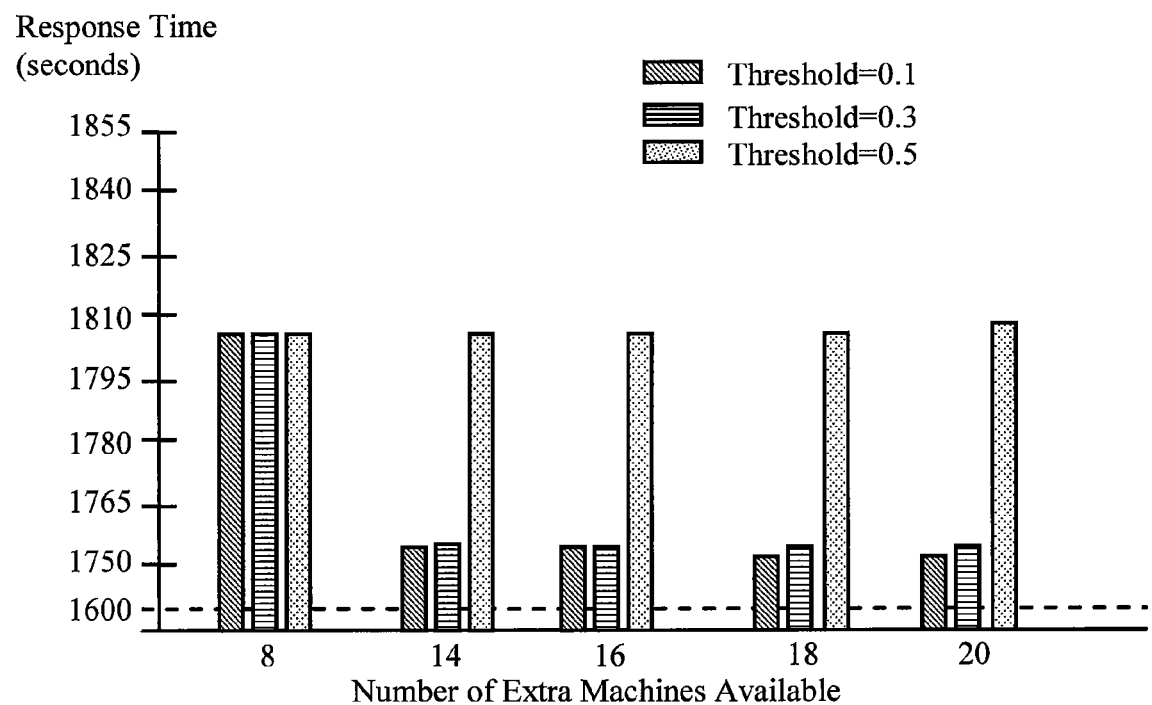
Figure 22:
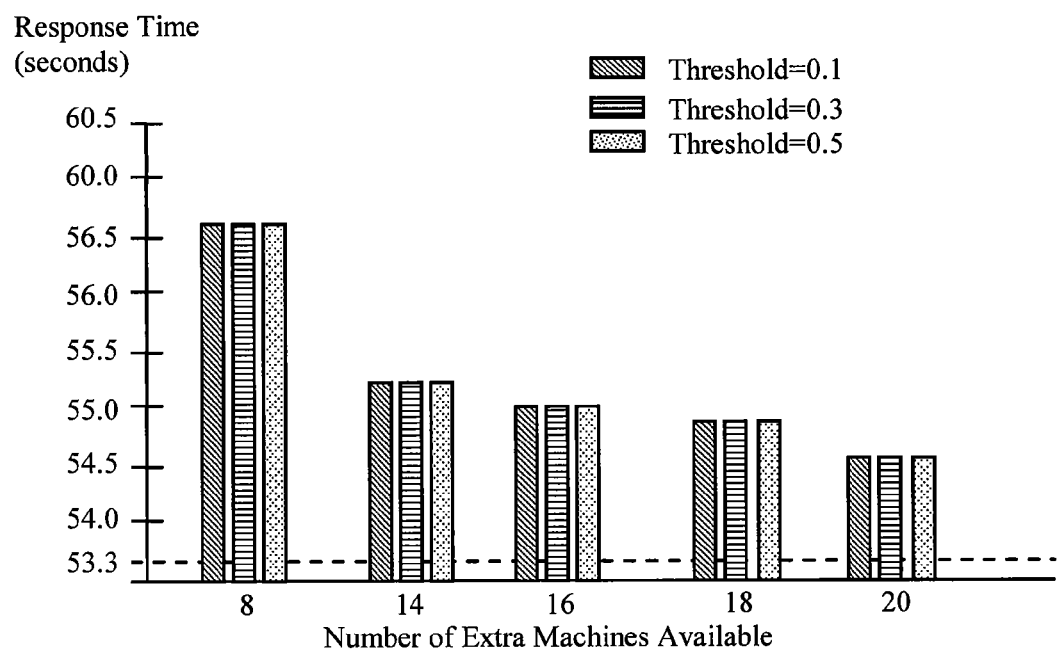
Figure 23:
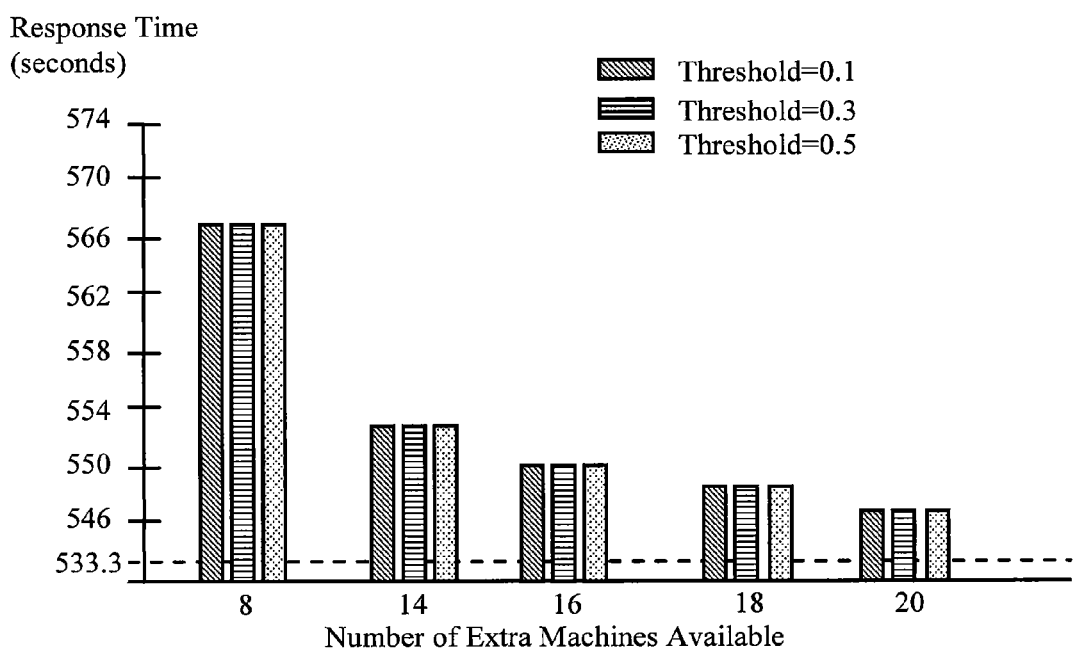
Figure 24:
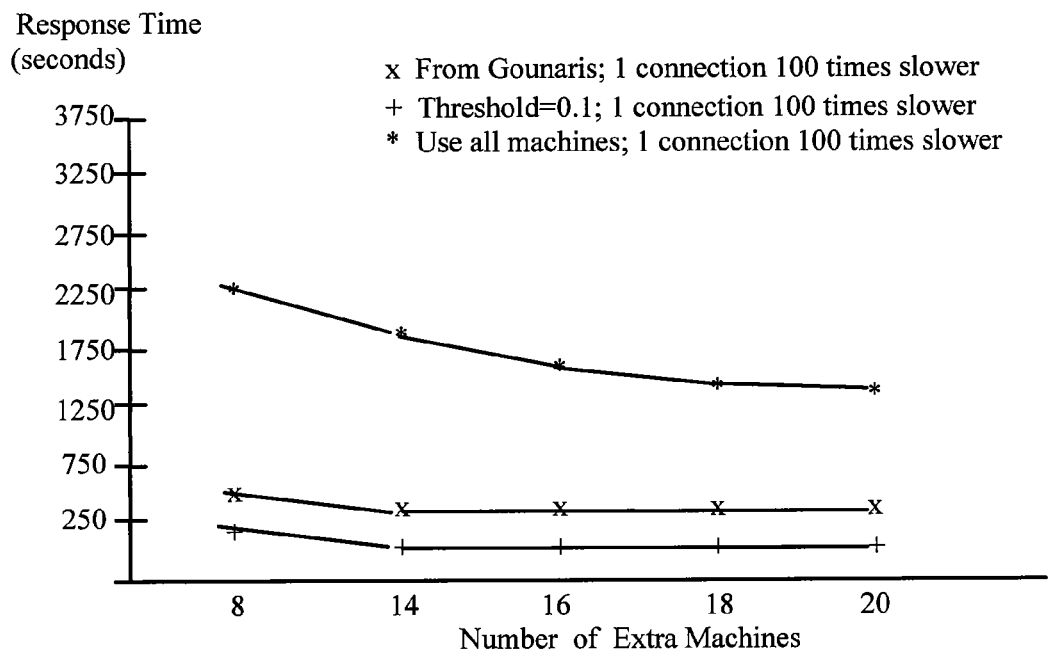
FIG. 24 is a graph showing a comparison of scheduling policies in the presence of a slow connection for a 5-join query over a data set.

FIG. 20 shows a comparison of response time with number of extra nodes for 5 Join query with Set_A. FIG. 21 shows a comparison of response time with number of extra nodes for 5 Join query with Set_B. FIG. 22 shows a comparison of response time with number of extra nodes for 1 Join query with Set_A. FIG. 23 shows a comparison of response time with number of extra nodes for 1 Join query with Set_B FIG. 24 compares the scheduling policy described herein with two different scheduling algorithms when the 5-join query is executed against Set_A in the presence of one slow inter-connect. The graph shown here is for the case when the connection is 100 times slower than the average (i.e., it transmits data at 6 KB/sec). All other resources are homogenous (i.e., the speed of evaluating the hash join is 30 microseconds, and the connection speed is 600 KB/sec). As can be seen from the diagram that the response times for each of the cases is lower than in Gounaris. Moreover, the performance degradation is significant when all the machines in the configuration pool are used evenly. We also tested the cases when the speed of the slower interconnect is 10 times slower than the average (can be seen from table 2a). Tables 2a and 2b show the response times in the presence of one slow interconnect for the 5-join query when executed against Set_A and Set_B respectively for a threshold value of 0.3 and for different number of extra machines. The response times for the query for a certain value of threshold and for a given number of extra machines is same irrespective of the speed of the slower interconnect (i.e. in either case (6 KB/sec and 60 KB/sec) the slower connection is not allocated). It is easy to infer, therefore, that the technique described herein avoids transmitting data on the slower interconnect. The exercise is repeated for the query with 1-join. The corresponding values are shown in tables 3a and 3b.

TABLE 2a

Response times in the presence of 1 slow interconnect for the case of 5-Join query with Set A

| Case | Number of extra machines | Threshold | Speed of the slower interconnect | Number of machines assigned | Response time (sec) |
|---|---|---|---|---|---|
| 1 | 20 | 0.3 | 60 KB/sec | 10 | 178.23 |
| 2 | 20 | 0.3 | 6 KB/sec | 10 | 178.23 |

TABLE 2a-continued

Response times in the presence of 1 slow interconnect
for the case of 5-Join query with Set A

| Case | Number of extra machines | Threshold | Speed of the slower interconnect | Number of machines assigned | Response time (sec) |
|---|---|---|---|---|---|
| 3 | 18 | 0.3 | 60 KB/sec | 10 | 178.23 |
| 4 | 18 | 0.3 | 6 KB/sec | 10 | 178.23 |
| 5 | 16 | 0.3 | 60 KB/sec | 10 | 178.23 |
| 6 | 16 | 0.3 | 6 KB/sec | 10 | 178.23 |
| 7 | 14 | 0.3 | 60 KB/sec | 10 | 178.23 |
| 8 | 14 | 0.3 | 6 KB/sec | 10 | 178.23 |
| 9 | 8 | 0.3 | 60 KB/sec | 5 | 178.23 |
| 10 | 8 | 0.3 | 6 KB/sec | 5 | 178.23 |

TABLE 2b

Response times in the presence of 1 slow interconnect
for the case of 5-Join query with Set B

| Case | Number of extra machines | Threshold | Speed of the slower interconnect | Number of machines assigned | Response time (sec) |
|---|---|---|---|---|---|
| 1 | 20 | 0.3 | 60 KB/sec | 10 | 1786.65 |
| 2 | 20 | 0.3 | 6 KB/sec | 10 | 1786.65 |
| 3 | 18 | 0.3 | 60 KB/sec | 10 | 1786.65 |
| 4 | 18 | 0.3 | 6 KB/sec | 10 | 1786.65 |
| 5 | 16 | 0.3 | 60 KB/sec | 10 | 1786.65 |
| 6 | 16 | 0.3 | 6 KB/sec | 10 | 1786.65 |
| 7 | 14 | 0.3 | 60 KB/sec | 10 | 1786.65 |
| 8 | 14 | 0.3 | 6 KB/sec | 10 | 1786.65 |
| 9 | 8 | 0.3 | 60 KB/sec | 5 | 1786.65 |
| 10 | 8 | 0.3 | 6 KB/sec | 5 | 1786.65 |

TABLE 3a

Response times in the presence of 1 slow interconnect
for the case of 1-Join query with Set A

| Case | Number of extra machines | Threshold | Speed of the slower interconnect | Number of machines assigned | Response time (sec) |
|---|---|---|---|---|---|
| 1 | 20 | 0.3 | 60 KB/sec | 20 | 160.38 |
| 2 | 20 | 0.3 | 6 KB/sec | 20 | 160.38 |
| 3 | 18 | 0.3 | 60 KB/sec | 18 | 160.92 |
| 4 | 18 | 0.3 | 6 KB/sec | 18 | 160.92 |
| 5 | 16 | 0.3 | 60 KB/sec | 16 | 161.04 |
| 6 | 16 | 0.3 | 6 KB/sec | 16 | 161.04 |
| 7 | 14 | 0.3 | 60 KB/sec | 14 | 161.18 |
| 8 | 14 | 0.3 | 6 KB/sec | 14 | 161.18 |
| 9 | 8 | 0.3 | 60 KB/sec | 8 | 162.07 |
| 10 | 8 | 0.3 | 6 KB/sec | 8 | 162.07 |

TABLE 3b

Response times in the presence of 1 slow interconnect
for the case of 1-Join query with Set B

| Case | Number of extra machines | Threshold | Speed of the slower interconnect | Number of machines assigned | Response time (sec) |
|---|---|---|---|---|---|
| 1 | 20 | 0.3 | 60 KB/sec | 20 | 1608.49 |
| 2 | 20 | 0.3 | 6 KB/sec | 20 | 1608.49 |
| 3 | 18 | 0.3 | 60 KB/sec | 18 | 1609.44 |
| 4 | 18 | 0.3 | 6 KB/sec | 18 | 1609.44 |
| 5 | 16 | 0.3 | 60 KB/sec | 16 | 1610.62 |
| 6 | 16 | 0.3 | 6 KB/sec | 16 | 1610.62 |
| 7 | 14 | 0.3 | 60 KB/sec | 14 | 1612.14 |
| 8 | 14 | 0.3 | 6 KB/sec | 14 | 1612.14 |

TABLE 3b-continued

Response times in the presence of 1 slow interconnect
for the case of 1-Join query with Set B

| Case | Number of extra machines | Threshold | Speed of the slower interconnect | Number of machines assigned | Response time (sec) |
|---|---|---|---|---|---|
| 9 | 8 | 0.3 | 60 KB/sec | 8 | 1621.25 |
| 10 | 8 | 0.3 | 6 KB/sec | 8 | 1621.25 |

To test the scalability and the complexity of our scheduling algorithm, a bushy query plan with seven joins of the type shown in FIG. 7 was considered and the total execution time of the technique was observed. Experiments with 10 nodes, 20 nodes, 100 nodes, 500 nodes and 1000 nodes and with different values of threshold ($\delta$) were conducted. Tables 4a, 4b and 4c shows the total execution time with $\delta$=0.5, 0.3 and 0.1 respectively, for the different test cases. Table 5a, 5b and 5c shows the corresponding results for the query plan with 15 joins and for different values of threshold.

TABLE 4a

Results for 7 join query with $\delta = 0.5$

| Case | Number of machines | Number of machines assigned | Total Execution Time (ms) | Response Time (sec) |
|---|---|---|---|---|
| 1 | 10 | 7 | <1 | 795.92 |
| 2 | 20 | 7 | 15 | 795.92 |
| 3 | 50 | 7 | 31 | 795.92 |
| 4 | 100 | 7 | 62 | 795.92 |
| 5 | 500 | 7 | 2875 | 795.92 |
| 6 | 1000 | 7 | 24063 | 795.92 |

TABLE 4b

Results for 7 join query with $\delta = 0.3$

| Case | Number of machines | Number of machines assigned | Total Execution Time (ms) | Response Time (sec) |
|---|---|---|---|---|
| 1 | 10 | 9 | <1 | 777.70 |
| 2 | 20 | 11 | 15 | 777.60 |
| 3 | 50 | 13 | 31 | 734.30 |
| 4 | 100 | 13 | 62 | 734.30 |
| 5 | 500 | 13 | 2797 | 734.30 |
| 6 | 1000 | 13 | 24204 | 734.30 |

TABLE 4c

Results for 7 join query with $\delta = 0.1$

| Case | Number of machines | Number of machines assigned | Total Execution Time (ms) | Response Time (sec) |
|---|---|---|---|---|
| 1 | 10 | 9 | <1 | 777.70 |
| 2 | 20 | 13 | 16 | 773.70 |
| 3 | 50 | 17 | 31 | 720.91 |
| 4 | 100 | 17 | 63 | 720.91 |
| 5 | 500 | 17 | 2765 | 720.91 |
| 6 | 1000 | 17 | 24453 | 720.91 |

TABLE 5a

Results for 15 join query with δ = 0.5

| Case | Number of machines | Number of machines assigned | Total Execution Time (ms) | Response Time (sec) |
|---|---|---|---|---|
| 1 | 20 | 15 | 15 | 834.07 |
| 2 | 50 | 15 | 32 | 834.07 |
| 3 | 100 | 15 | 78 | 834.07 |
| 4 | 500 | 15 | 3203 | 834.07 |
| 5 | 1000 | 15 | 26579 | 834.07 |

TABLE 5b

Results for 15 join query with δ = 0.3

| Case | Number of machines | Number of machines assigned | Total Execution Time (ms) | Response Time (sec) |
|---|---|---|---|---|
| 1 | 20 | 16 | 15 | 829.57 |
| 2 | 50 | 27 | 31 | 808.74 |
| 3 | 100 | 29 | 78 | 756.34 |
| 4 | 500 | 29 | 3031 | 756.34 |
| 5 | 1000 | 29 | 26612 | 756.34 |

TABLE 5c

Results for 15 join query with δ = 0.1

| Case | Number of machines | Number of machines assigned | Total Execution Time (ms) | Response Time (sec) |
|---|---|---|---|---|
| 1 | 20 | 16 | 15 | 829.57 |
| 2 | 50 | 30 | 47 | 802.90 |
| 3 | 100 | 35 | 78 | 736.99 |
| 4 | 500 | 35 | 3094 | 736.99 |
| 5 | 1000 | 35 | 26782 | 736.99 |

Example 44

Exemplary Other Information

The problem of scheduling parallel queries in heterogeneous systems was considered. Present day distributed database applications operating in these environments process compute intensive queries by exploiting different forms of parallelism in only a limited way. Such limits adversely affect the performance of the compute intensive queries. A low complexity query scheduler can take care of different (e.g., all) forms of parallelism while allocating machines to the sub-plans. The scheduler can be a recursive two-stage scheme and be based on a shortest path algorithm. The scheduler can exploit the binary tree structure of the query plans to determine most profitable allocations. The scheme outlined can efficiently allocate machines and can take care of pipelined and partitioned parallelism at the same time.

Extensive experimentation shows that the scheduling technique outperforms the scheduling policies used in practice in parallel and distributed database systems. The technique not only matches the performance but also improves upon the solution in a majority of the cases mentioned in Gounaris.

Suitable modifications can be made for taking into account initial data layouts and the availability of the multiprocessor machines in the pool.

A low complexity query scheduling technique can simultaneously exploit partitioned and pipelined parallelism together with independent parallelism. The technique can efficiently deal with the allocation of multiprocessor machines in the pool of available extra machines. The technique can efficiently handle allocation of machines to sub-plans of a bushy query plan—which can be the most profitable query plan in distributed environments.

Example 45

Exemplary Computing Environment

Figure 25:
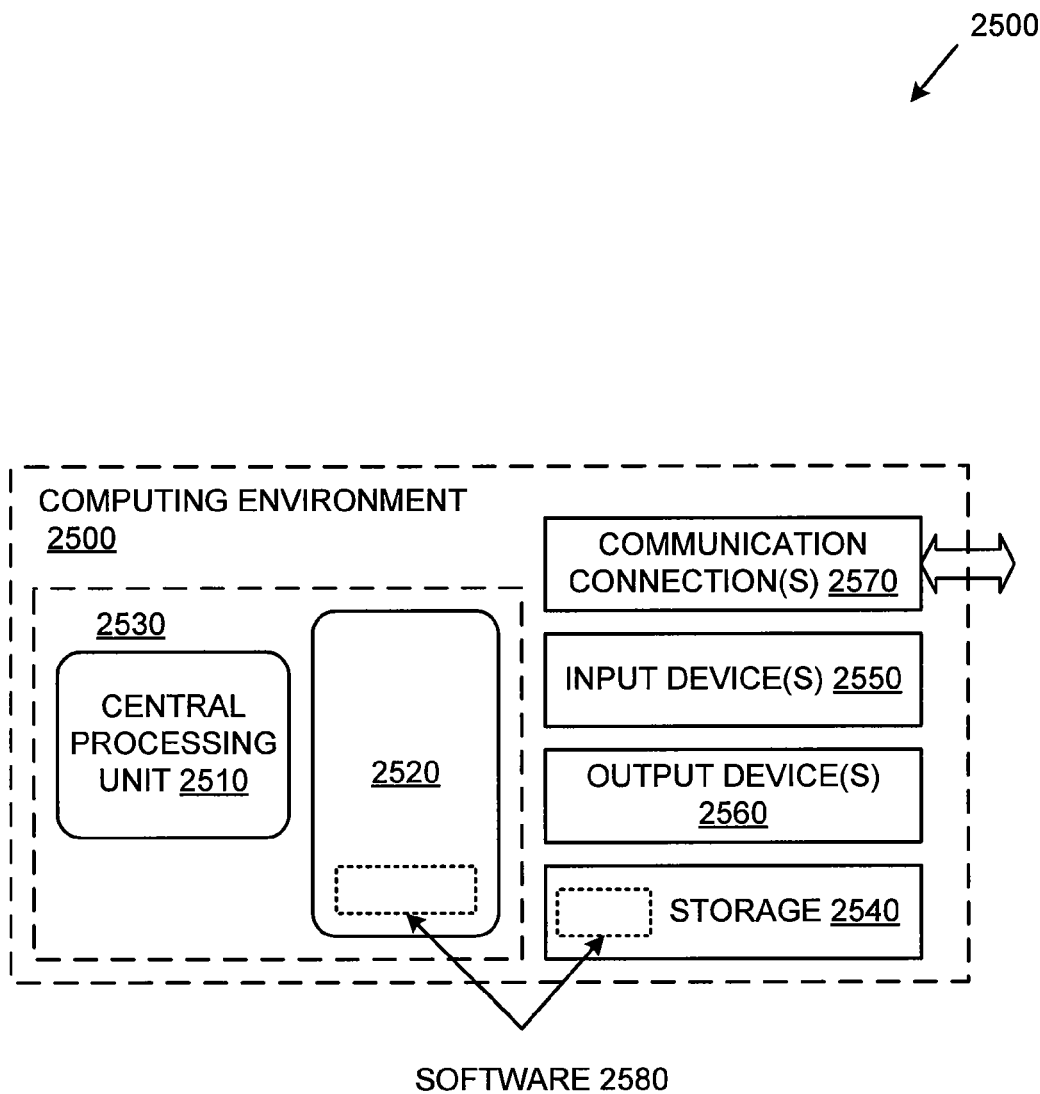
FIG. 25 is a block diagram of an exemplary suitable computing environment for implementing any of the technologies described herein.

FIG. 25 illustrates a generalized example of a suitable computing environment 2500 in which the described techniques can be implemented. The computing environment 2500 is not intended to suggest any limitation as to scope of use or functionality, as the technologies may be implemented in diverse general-purpose or special-purpose computing environments. A mainframe environment will be different from that shown, but can also implement the technologies and can also have computer-readable media, one or more processors, and the like.

With reference to FIG. 25, the computing environment 2500 includes at least one processing unit 2510 and memory 2520. In FIG. 25, this basic configuration 2530 is included within a dashed line. The processing unit 2510 executes computer-executable instructions and may be a real or a virtual processor. In a multi-processing system, multiple processing units execute computer-executable instructions to increase processing power. The memory 2520 may be volatile memory (e.g., registers, cache, RAM), non-volatile memory (e.g., ROM, EEPROM, flash memory, etc.), or some combination of the two. The memory 2520 can store software 2580 implementing any of the technologies described herein.

A computing environment may have additional features. For example, the computing environment 2500 includes storage 2540, one or more input devices 2550, one or more output devices 2560, and one or more communication connections 2570. An interconnection mechanism (not shown) such as a bus, controller, or network interconnects the components of the computing environment 2500. Typically, operating system software (not shown) provides an operating environment for other software executing in the computing environment 2500, and coordinates activities of the components of the computing environment 2500.

The storage 2540 may be removable or non-removable, and includes magnetic disks, magnetic tapes or cassettes, CD-ROMs, CD-RWs, DVDs, or any other computer-readable media which can be used to store information and which can be accessed within the computing environment 2500. The storage 2540 can store software 2580 containing instructions for any of the technologies described herein.

The input device(s) 2550 may be a touch input device such as a keyboard, mouse, pen, or trackball, a voice input device, a scanning device, or another device that provides input to the computing environment 2500. For audio, the input device(s) 2550 may be a sound card or similar device that accepts audio input in analog or digital form, or a CD-ROM reader that provides audio samples to the computing environment. The output device(s) 2560 may be a display, printer, speaker, CD-writer, or another device that provides output from the computing environment 2500.

The communication connection(s) 2570 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Readable Media

Any of the methods described herein can be implemented by computer-executable instructions in one or more computer-readable media (e.g., computer-readable storage media or other tangible media). The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. A method of allocating computing resources in a grid to an executable query plan, wherein the executable query plan is dividable into a plurality of query sub-plans at a plurality of query sub-plan levels in the executable query plan, the method comprising:
    repeatedly splitting the query plan into query plan segments and provisionally allocating computing resources in the grid to the query plan segments comprising query-sub plans until the query plan segments have no more than one query sub-plan level, thereby forming a provisional allocation;
    computing sub-plan workload densities for respective query sub-plan levels of a query plan segment comprising the query plan;
    wherein the splitting the query plan into query plan segments comprises:
        splitting the query plan segment comprising the query plan at a point in the query plan segment comprising the query plan where a summation of level workload densities of different consecutive query sub-plan levels of the query sub-plan levels exceeds half of a total workload density for the query plan segment comprising the query plan;
    wherein the computing resources in the grid comprise a first computing resource and a second computing resource and the query plan segments comprise a first query plan segment and a second query plan segment;
    wherein provisionally allocating computing resources in the grid to the query plan segments comprises:
        finding a shortest path between a source and a sink in a graph, the shortest path in the graph comprising a first edge representing a cost of processing the first query plan segment at the first computing resource and a second edge representing a cost of processing the second query plan segment at the second computing resource; and
    distributing the computing resources in the grid among the query sub-plans in respective of the query plan segments according to the provisional allocation.

2. The method of claim 1 wherein distributing the computing resources in the grid among the query sub-plans comprises:
    dividing computing resources provisionally allocated to a query plan segment among query sub-plans of the query plan segment.

3. The method of claim 2 wherein dividing the computing resources comprises:
    constructing a table storing process cost values for respective permutations of query sub-plans and computing resources;
    finding a minimum process cost value in the table; and
    allocating a computing resource associated with the minimum process cost value to a query sub-plan associated with the minimum process cost value.

4. The method of claim 3 wherein the process cost values are normalized via an amount of processing estimated for respective query sub-plans.

5. The method of claim 1 wherein distributing the computing resources in the grid among the query sub-plans comprises:
    responsive to determining that allocating a computing resource to a particular query sub-plan does not improve performance, ceasing to allocate further computing resources to the particular query sub-plan.

6. The method of claim 1 wherein provisionally allocating computing resources in the grid to the query plan segments comprises:
    representing the computing resources in the grid as nodes in a graph;
    representing a pair of the query plan segments in the graph;
    representing a cost of communicating between the computing resources in the grid as edges in the graph; and
    responsive to finding the shortest path, provisionally allocating computing resources represented by nodes in the shortest path to respective query plan segments in the graph.

7. The method of claim 6 wherein:
    multiprocessor computing resources are represented in the graph as separate computing resources.

8. The method of claim 6 further comprising:
    adjusting the graph to account for data locality.

9. The method of claim 1 further comprising:
    accounting for data locality, wherein accounting for data locality comprises:
    excluding from allocation considerations computing resources at which data tables accessed by the query plan reside initially.

10. The method of claim 1 wherein the method further comprises:
    imposing a constraint of only those query sub-plans that belong to adjacent levels of the query plan can be allocated to a same multiprocessor machine.

11. The method of claim 1 wherein provisionally allocating computing resources in the grid to the query plan segments comprises:

provisionally allocating resources until all allocable resources are allocated or allocation of resources does not improve performance.

12. The method of claim 1 wherein allocating computing resources addresses both pipelined parallelism and partitioned parallelism.

13. A computer-implemented method of allocating resources for executing a query according to a query plan, the method comprising:
receiving a representation of the query plan, wherein the query plan is dividable into a plurality of query sub-plans;
dividing the query plan into a plurality of segments of the query plan having respective one or more query sub-plans of the query plan, the plurality of segments comprising a first segment and a second segment, wherein the dividing the query plan into the plurality of segments comprises:
computing sub-plan workload densities for respective levels of a third segment; and
dividing the third segment at a point in the third segment where a summation of level workload densities of different consecutive levels of the levels of the third segment exceeds half of a total workload density for the third segment;
creating a graph representation of connections between the plurality of segments of the query plan, wherein the graph representation comprises a plurality of nodes representing respective computing resources of a plurality of computing resources and a plurality of connecting edges representing respective resource costs, wherein the plurality of connecting edges comprise a first connecting edge and a second connecting edge and wherein the plurality of computing resources comprise a first computing resource and a second computing resource;
finding a shortest path between the first segment and the second segment in the graph representation, the shortest path comprises the first connecting edge representing a cost of processing the first segment at the first computing resource and the second connecting edge representing a cost of processing the second segment at the second computing resource;
responsive to finding the shortest path, allocating computing resources associated with the shortest path to respective segments of the query plan; and
allocating the computing resources to query sub-plans of the query plan according to allocations to the segments of the query plan, thereby forming an allocation of the computing resources to the query sub-plans; and
outputting the allocation of the computing resources to the query sub-plans.

14. A computer-implemented method of indicating an allocation of computing resources to a query plan comprising a plurality of query sub-plans, the method comprising:
receiving a representation of the query plan;
splitting the query plan into segments of the query plan, the segments of the query plan comprising a first query plan segment, a second query plan segment, and a third query plan segment, wherein the splitting the query plan into the segments of the query plan comprises:
computing sub-plan workload densities for respective levels of the third query plan segment; and
splitting the third query plan segment at a point in the third query plan segment where a summation of level workload densities of different consecutive levels of the levels of the third query plan segment exceeds half of a total workload density for the third query plan segment;
constructing a graph representing connections between a plurality of the segments of the query plan comprising query sub-plans and the computing resources, wherein the plurality of the segments of the query plan comprise the first query plan segment and a the second query plan segment and the computing resources comprise a first computing resource and a second computing resource;
performing a shortest path search on the graph, wherein the performing the shortest path search on the graph comprises:
finding a shortest path between a source and a sink in the graph, the shortest path in the graph comprising a first edge representing a cost of processing the first query plan segment at the first computing resource and a second edge representing a cost of processing the second query plan segment at the second computing resource;
based on results of the shortest path search, determining an allocation of computing resources to respective query sub-plans, removing allocated computing resources from the graph, and repeating the shortest path search; and
outputting the allocation of computing resources to the respective query sub-plans.

15. The computer-implemented method of claim 14 wherein:
pipelined parallelism is addressed via evaluation of communication costs between the computing resources; and
partitioned parallelism is addressed via assigning a plurality of computing resources to a single query sub-plan of the query plan.

16. One or more computer-readable storage media comprising computer-executable instructions causing a computer to perform a method comprising:
receiving a query plan;
initially considering the query plan as a single query segment;
repeatedly splitting query segments of the query plan having more than one level into child query segments until the child query segments have one level;
after splitting a query segment, allocating machines to the child query segments of the query plan via repeatedly finding a shortest path in a graph representing costs of processing the segments at various machines in a grid and costs of communicating between machines in the grid, wherein nodes representing the allocated machines are removed from the graph after allocation;
wherein finding the shortest path in the graph comprises finding a shortest path between a source representing a first child query segment in the graph and a sink representing a second child query segment in the graph, the shortest path in the graph comprising a first edge representing a cost of processing the first child query segment at a first computing resource, a second edge representing a cost of processing the second child query segment at the second computing resource, and a third edge representing a cost of communicating between the first computing resource and the second computing resource;
when the query segments have been reduced to one level, distributing machines allocated to respective segments among query sub-plans within the respective segments based at least on consideration of a total time for respective of the machines to process respective of the query sub-plans, wherein the distributing comprises repeatedly performing (a)-(e):

(a) constructing a table storing process cost values for respective permutations of query sub-plans and computing resources;
(b) finding a minimum process cost value in the table;
(c) allocating a computing resource associated with the minimum process cost value to a query sub-plan associated with the minimum process cost value;
(d) removing the computing resource and the query sub-plan associated with the minimum process cost value from the table; and
(e) determining whether allocating further resources to the query sub-plan associated with the minimum process cost value is profitable, and responsive to determining that allocating further computing resources to the query sub-plan is not profitable, ceasing to allocate further computing resources to the query sub-plan.

17. A system configured to allocate machines in a grid to a query plan, the system comprising:
   at least one processor;
   memory;
   a stored query plan comprising a plurality of query sub-plans and associated stored estimates of an amount of data to be processed by respective sub-plans of the query plan;
   a machine allocator comprising a graph representation of query segments of the query plan and the machines, wherein the query plan is split into the query segments comprising the plurality of query sub-plans, wherein the splitting of the query plan comprises:
      computing sub-plan workload densities for respective levels of a query segment with more than one level; and
      splitting the query segment with more than one level at a point in the query segment with more than one level where a summation of level workload densities of different consecutive levels of the query plan segment with more than one level exceeds half of a total workload density for the query plan segment with more than one level;
   wherein the graph representation represents a cost of processing a first query segment at respective of the machines and a cost of communicating between the machines, wherein the machine allocator finds a shortest path between a source and a sink in the graph representation and allocates machines in the shortest path to respective query segments of the query plan, wherein the shortest path between the source and the sink in the graph representation comprises a first edge representing a cost of processing the first query segment at a first machine of the machines and a second edge representing a cost of processing a second query segment at a second machine of the machines; and
   a stored allocation of computing resources to respective sub-plans of the query plan.

18. The system of claim 17 wherein the graph representation comprises a representation of intra-processor communication cost for a multi-processor machine.

19. The system of claim 17 wherein the machine allocator is operable to cease allocating machines to a particular query sub-plan responsive to determining that there are no further estimated performance gains.

* * * * *